United States Patent [19]
Goto et al.

[11] Patent Number: 6,025,072
[45] Date of Patent: Feb. 15, 2000

[54] HEAT-RESISTANT RESIN COMPOSITIONS AND INTERNAL COMBUSTION ENGINE PARTS USING SAME

[75] Inventors: Yoshihisa Goto; Toshihiko Tsutsumi, both of Yokohama; Toshiaki Takahashi, Hadano; Takatoshi Sagawa, Yokohama, all of Japan

[73] Assignees: Mitsui Chemicals, Inc., Tokyo; Nissan Motor Co., Ltd., Yokohama, both of Japan

[21] Appl. No.: 07/988,037

[22] Filed: Dec. 9, 1992

Related U.S. Application Data

[63] Continuation of application No. 07/381,400, filed as application No. PCT/JP88/01213, Nov. 30, 1988, abandoned.

[30] Foreign Application Priority Data

| Nov. 30, 1987 | [JP] | Japan | 62-300187 |
| Feb. 2, 1988 | [JP] | Japan | 63-021251 |
| Feb. 8, 1988 | [JP] | Japan | 63-025679 |
| Sep. 22, 1988 | [JP] | Japan | 63-236598 |

[51] Int. Cl.[7] .................................................. B32B 9/00
[52] U.S. Cl. ........................ 428/367; 428/364; 428/375; 428/408
[58] Field of Search .................................. 428/364, 367, 428/375, 408; 427/384, 372.2

[56] References Cited

U.S. PATENT DOCUMENTS

| 3,785,916 | 1/1974 | Turton et al. | 428/367 |
| 4,764,427 | 8/1988 | Hara et al. | 428/395 |

FOREIGN PATENT DOCUMENTS

| 384712 | 8/1980 | European Pat. Off. . |
| 0156488 | 10/1985 | European Pat. Off. . |
| 392408 | 10/1990 | European Pat. Off. . |
| 2091621 | 1/1972 | France . |
| 47-10493 | 5/1972 | Japan . |
| 50-100610 | 8/1975 | Japan . |
| 53-106752 | 9/1978 | Japan . |
| 53-121872 | 10/1978 | Japan . |
| 56-90837 | 7/1981 | Japan . |
| 56-120730 | 9/1981 | Japan . |
| 57-119105 | 7/1982 | Japan . |
| 62-119268 | 11/1985 | Japan . |
| 62-115033 | 5/1987 | Japan . |
| 62-279913 | 12/1987 | Japan . |
| 63-278825 | 11/1988 | Japan . |
| 2177707 | 1/1987 | United Kingdom . |

*Primary Examiner*—William Krynski
*Assistant Examiner*—J. M. Gray
*Attorney, Agent, or Firm*—Oblon, Spivak, McClelland, Maier & Neustadt, P.C.

[57] ABSTRACT

A carbon fiber covered on the surface with an aromatic polysulfone resin and then heated at 300–400° C., a heat-resistant resin composition with excellent mechanical strength comprising 5–50% by weight of the carbon fiber and 95–50% by weight of a heat-resistant resin, and an internal combustion engine part, particularly an impeller of centrifugal compressor produced in one step, using the resin composition.

6 Claims, 11 Drawing Sheets

HEAT-RESISTANT RESIN COMPOSITIONS AND INTERNAL COMBUSTION ENGINE PARTS USING SAME

This application is a Continuation of application Ser. No. 07/381,400, filed on Jul. 18, 1989, now abandoned which is a 371 of PCT/JP 80/01213 filed Nov. 30, 1988.

TECHNICAL FIELD

The invention relates to a heat-resistant resin composition with excellent mechanical strength, and to an internal combustion engine part, for example, an impeller of a centrifugal compressor produced in one step, in which the resin composition is employed.

BACKGROUND ART

Heat-resistant resins, such as polyether sulfone (hereinafter abbreviated as PES), polyether imide (hereinafter abbreviated as PEI), polysulfone (hereinafter abbreviated as PSF), polyamide imide (hereinafter abbreviated as PAI), polyimide (hereinafter abbreviated as PI), polyphenylene sulfide (hereinafter abbreviated as PPS), polyether ether ketone (hereinafter abbreviated as PEEK), aromatic polyester (hereinafter abbreviated as PER) and polyether ketone (hereinafter abbreviated as PEK), are much superior in heat resistance and mechanical strength to engineering plastics of the general purpose grade, and hence are named super engineering plastics. They find a variety of applications in the field of electric and electonic equipment, machines, automobiles, etc.

Recent progress of technology has however been urging these heat-resistant resins to improve further their properties, particularly mechanical strength.

Thus, it has been practiced to improve the mechanical strength and heat resistance of the heat-resistant resins by blending them with a fibrous reinforcing material, particularly a carbon fiber.

Carbon fibers are being used in large amounts in carbon fiber-reinforced plastics whose matrices are epoxy resins. Hence, epoxy resins are used as binders of carbon fibers. However, although the epoxy resin binders are effective when thermosetting resins such as epoxy resins are used as matrices, their adherence is so poor to the aforesaid heat resistant resins that they hardly produce resin compositions excellent in mechanical strength. For this reason, it has been attempted in the case of thermoplastic resins to use polyamide resins as a binder of carbon fibers, as seen in Japanese Patent Laid-Open No. 106752/1978. Further, a disclosure is made in Japanese Patent Laid-Open No. 120730/1981 to use carbon fibers bound with aromatic polysulfone resins.

As conventional internal combustion engine parts, for example, impellers made of fiber-reinforced resins, there are those described in Japanese Patent Publication No. 48684/1977 and Japanese Patent Laid-Open No. 119105/1982. The resin materials composing the impellers are characterized by incorporating carbon fibers as reinforcing materials of the resins. Particularly, in Japanese Patent Laid-Open No. 119105/1982, it is disclosed that impellers can be prepared from a carbon fiber-reinforced resin in which a heat-resistant thermoplastic or thermosetting resin is used as the matrix resin.

When the above-described carbon fiber bound with an epoxy or polyamide resin is applied to the aforementioned heat-resistant resin, the binder dissociates thermally during molding to form voids or to decrease the strength of the weld part, because the molding temperature of the heat-resistant resin is required to be as high as at least 300° C.

To overcome this problem, carbon fibers bound with aromatic polysulfone resins are used so as to eliminate the formation of voids and the decrease of the strength of the weld part, as seen in Japanese Patent Laid-Open No. 120730/1981. However, the resulting resin compositions show only a small improvement in mechanical strength, and therefore a further improvement in the mechanical strength is desired.

The service conditions of existing internal combustion engine parts, e.g., impellers of centrifugal compressors are in the range of from –50° C. to 200° C. (the highest temperature in usual service: 150° C.) and $13 \times 10^4$ rpm as the maximum number of revolution. Moreover, the maximum stress generated at the maximum number of revolution amounts to about 20 kg/mm$^2$ for existing impellers (made of aluminum alloys; with an outer diameter of about 60 mm) and about 10 kg/mm$^2$ at their blade roots.

It is hence preferable to use a fiber-reinforced resin that has a small specific gravity, because it allows the maximum stress during revolution to decrease to about one half. However, when an impeller material is selected in view of its heat resistance, strength, modulus of elasticity, durability, tension and compression creep characteristics, etc. under such existing service conditions, the thermoplastic or thermosetting resins disclosed in Japanese Patent Laid-Open No. 119105/1982 may not be used as the material unless modified.

As fiber-reinforced resin compositions meeting these conditions, it may be thought of to compound heat-resistant resins including PES, PEI, PEEK, PAI, etc. with carbon fibers, glass fibers, wiskers, etc. However, the aforesaid resins have high glass transition temperatures or melting temperatures so that it is necessary to mold them by melting at temperatures as high as 360° C.–420° C.

As for the carbon fiber in particular, existing commercially available carbon fibers for resin reinforcement employ primarily a thermoplastic polyamide resin (dissociation temperature: 280° C.) and a thermosetting epoxy resin (dissociation temperature: 300° C.) as the surface treating agent (binder). Therefore, at the aforesaid resin melting temperatures (360° C.–420° C.) upon molding, these resins are liable to dissociate, resulting in the reduction of the boundary strength between the carbon fiber and the matrix resin due to insufficient wetting. Further, the resulting molded products are apt to have dispersed strengths. Therefore, when these fiber-reinforced resins are used as an impeller material for centrifugal compressors, the resulting impellers may not effectively be reinforced and cured by the carbon fiber and hence their strength will be low.

DISCLOSURE OF THE INVENTION

The invention has aimed to solve the above-described various problems. An object of the invention is to provide a carbon fiber which gives sufficient reinforcing effects when blended with heat-resistant resins and whose resin-blended composition gives little formation of voids and little reduction of the strength of the weld part upon molding as well as has excellent mechanical strength, and a heat-resistant resin composition containing the carbon fiber.

Another object of the invention is to provide an internal combustion engine part, for example, an impeller for a centrifugal compressor produced in one step, which is composed of the above-described heat-resistant resin composition.

The inventors have made a variety of investigations and finally found that the aforesaid objects can be achieved by blending a carbon fiber, which has been covered on its surface with an aromatic polysulfone resin as a binder and heated at 300–400° C., with a heat-resistant resin. The invention has been completed on the basis of these findings.

Thus, the invention offers a carbon fiber covered on its surface with an aromatic polysulfone resin as a binder and then heated at 300–400° C., a resin composition formed by blending the carbon fiber with a heat-resistant resin, and an internal combustion engine part made of the resin composition.

Figure 1:
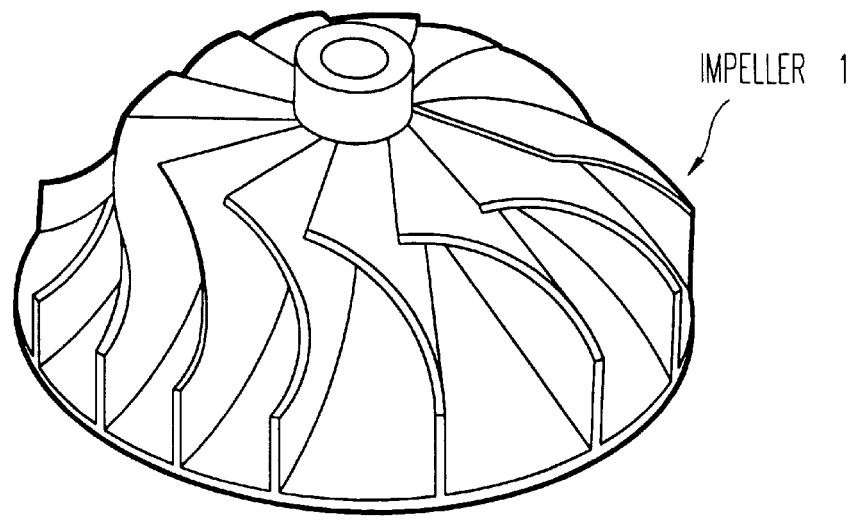
FIG. 1 is an example of the invention and illustrates a bird's-eye view of an impeller.

| | |
|---|---|
| 1 impeller | 2 sleeve |
| 3 washer | 4 nut |
| 5 shaft | 6 built-up mold |
| 7 pin | 8 upper mold |
| 9 gate | 10 lower mold |
| 11 impeller forming section (cavity) | |
| A entrance of molding material | |

BEST MODE FOR THE PRACTICE OF THE INVENTION

The heat-resistant resins useful in the practice of the invention are what is called super engineering plastics, such as PES, PEI, PSF, PAI, PI, PPS, PEEK, PEK and PER.

In the invention, the aromatic polysulfone resins used to cover the surface of a carbon fiber as a binder are linear polymers using arylene, ether and sulfone linkages as bonding units. For example, linear polymers composed of the following structural units are well-known.

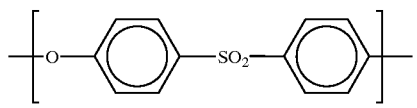

(1)

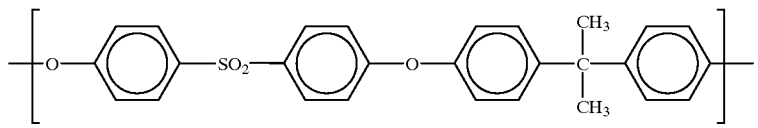

(2)

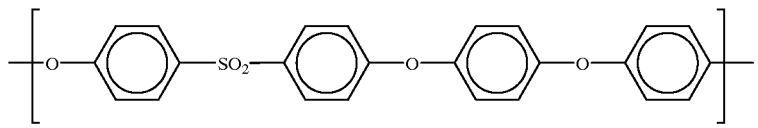

(3)

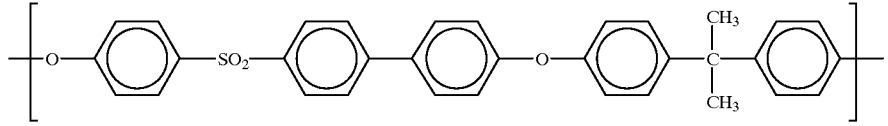

(4)

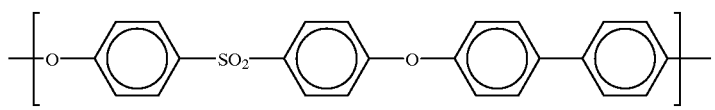

(5)

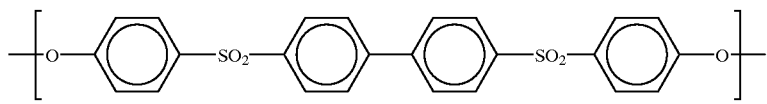

(6)

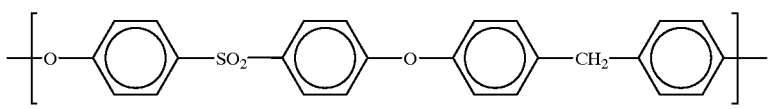

(7)

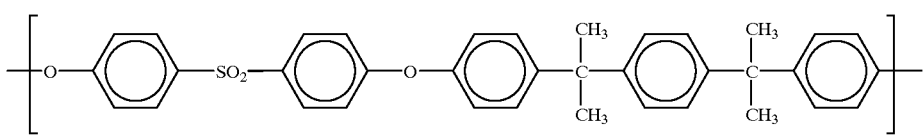

(8)

These aromatic polysulfone resins can be produced by the processes disclosed, for example, in Japanese Patent Publication Nos. 10067/1965, 7799/1967 and 617/1972, and one or more of these resins are used.

For instance, the polymer of the foregoing unit (1) is prepared in the following manner: dichlorodiphenylsulfone, an aqueous sodium sulfide solution and dimethyl sulfoxide are stirred in $N_2$ at 150° C. for 5 hours. Then, after all the water has been removed azeotropically by the addition of benzene, the benzene is removed by distillation. The remaining mixture is heated at 170° C. for 7 hours under stirring to obtain the polymer.

The polymer of the foregoing unit (2) is synthesized by neutralizing bisphenol A with KOH in $N_2$ in the presence of benzene and DMSO as solvents, removing the water thus-formed azeotropically with the benzene, thereby forming a solution of the K-salt of bisphenol A in DMSO containing absolutely no water, adding thereto 4,4'-dichlorodiphenylsulfone, and conducting their polycondensation at 135° C. for 4–5 hours.

Polysulfone resins represented by the structural unit (1) are on the market by the trade name of "VICTREX®, Polyether Sulfone (PES)" from ICI Ltd., England, by the trade name of "Sumiproi S" from Sumitomo Chemicals Co., and as "Polyether Sulfone (PES)" from Mitsui Toatsu Chemicals, Inc., by way of example. Among exemplary polysulfone resins represented by the structural unit (2) are "Udel Polysulfone (trade name)" of Amoco Performance Products Inc., USA, etc.

Carbon fibers useful in the practice of the invention may include those of acrylic, rayon, lignin and pitch origins, and all of them are being used. In the invention, a carbon fiber of acrylic origin, which is the highest in fiber strength, is used most favorably. These carbon fibers may take any forms including chopped strand, roving, cloth, etc. It is more preferable to oxidize the surface of these carbon fibers with ozone or by electrolytic oxidation, etc. in advance.

To cover these carbon fibers with the aromatic polysulfone resins, a carbon fiber is immersed in a solution formed by dissolving an aromatic polysulfone resin in a solvent, such as dichloromethane, chloroform, 1,2-dichloroethane, 1,1,2,2-tetrachloroethane, dimethyl sulfoxide, N-methyl-pyrrolidone, methyl ethyl ketone and 1,1,2-trichloroethane, and then the solvent is removed by drying, whereby a carbon fiber covered with an aromatic polysulfone resin is obtained.

The amount of the aromatic polysulfone resin used to cover a carbon fiber may be in the range of 0.1–10% by weight, particularly in the range of 0.5–9% by weight, and more favorably in the range of 1–8% by weight, based on 100 parts by weight of the carbon fiber. Any amounts less than 0.1% by weight will not bring about the effect of the invention, whereas amounts in excess of 10% by weight used to cover a carbon fiber will not improve the mechanical strength any more. Thus, any amounts outside the above-described range are meaningless.

The heat treatment of the carbon fiber thus-covered with an aromatic polysulfone resin is carried out by exposure to air at a temperature of 300–400° C., particularly to 340–380° C. The heat treatment time ranges from 3 to 20 hours, particularly from 5 to 15 hours.

A variety of approaches may be employed to blend a heat-resistant resin with the carbon fiber thus-covered with an aromatic polysulfone resin. For example, the blending is effected by cutting off the covered and heat-treated carbon fiber to a length of 3–6 mm, and feeding separately the resulting fiber fragments and a heat-resistant resin to a melt extruder. Alternatively, the fragments and the resin may be blended in advance in a mixer such as Henschel mixer, super mixer or ribbon blender, and then fed to a melt extruder. Further, it is possible to feed a carbon fiber roving, which has been covered and heat-treated, directly to a melt extruder so as to be blended with a heat-resistant resin.

In the invention, the blending proportion of a carbon fiber, which has been covered with an aromatic polysulfone resin and heat-treated, and a heat-resistant resin as the matrix resin is in the range of 5–50% by weight, preferably 10–50% by weight for the carbon fiber, and in the range of 95–50% by weight for the heat-resistant resin. If the amount of the carbon fiber blended is less than 5% by weight, the tensile strength of the resulting resin composition will be unfavorably low. If the carbon fiber is blended in an amount in excess of 50% by weight, uniform melt-blending of the resulting resin composition will be difficult and its melt-flowability will also be significantly degraded, resulting in the impairment of the moldability including injection moldability.

In the invention, fillers such as talc, calcium carbonate, mica and glass beads, fibrous reinforcing materials such as glass fiber, potassium titanate fiber, armaide fiber and ceramic fiber, stabilizers and colorants may be added to the above-described heat-resistant resin composition, if necessary, unless these additives impair the quality and properties of the resin composition of the invention. The resin composition comprising the improved carbon fiber of the invention and the heat-resistant resin may be formed into intended molded articles by any well-known molding methods including those of injection, extrusion, transfer, compression, etc. The thus-molded resin compositions of the invention are excellent in mechanical strength, particularly in the strength at high temperatures, and hence are used for machine parts and automobile parts, which need high mechanical strength at high temperatures, e.g., gears, cams, bushings, pulleys, sleeves, etc. Further, the resin compositions can be used for internal combustion engine parts, such as impellers of centrifugal compressors produced in one step, parts of exhausts for mufflers like manifolds, vulve guides, vulve stems, pistone skirts, oil pans, front covers, rocker covers, etc.

The heat-resistant resin composition of the invention can be used satisfactorily in the manufacture of internal combustion engine parts, for instance, impellers of centrifugal compressors produced in one step. As the matrix resins, PES, PEK and PEEK are more preferred. PES which contains chlorine groups at its (unit) terminals and has a medium or high viscosity (3,600–4,800 poise) is preferred, one with a viscosity of about 4,100 poise being particularly preferred. PEK is represented by the general formula:

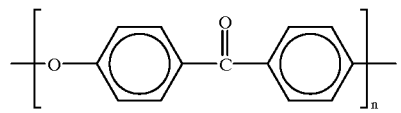

and PEEK is represented by the general formula:

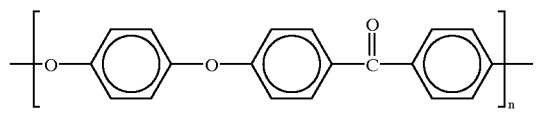

As the aromatic polysulfone resin used to treat the surface of a carbon fiber, one containing hydroxyl groups at its (unit) terminals and having a low molecular weight is preferred. The amount of the resin used for the covering may suitably be in the range of 0.1–10% by weight based on the carbon fiber. It is particularly preferable to employ one formed by covering the surface of a carbon fiber with an aromatic polysulfone resin and heating the resulting fiber at 350° C. for about 10 hours. The blending amount of the surface-treated carbon fiber may vary with the matrix resin used, but may suitably be in the range of 10–50% by weight based on the resulting composition, in general. Specifically, the ranges of 20–45% by weight, 20–40% by weight and 20–50% by weight are preferred respectively for PES, PEK and PEEK used as the matrix resins.

The molding of the internal combustion engine parts of the invention is generally carried out by conventionally-known methods, and the optimum conditions are properly determined by the variation of the content of the carbon fiber and the matrix resin.

The carbon fiber-reinforced heat-resistant resin composition is generally used in the form of pellets, for convenience to handle, as a molding material and formed into products by injection molding. The pellets are prepared by blending a heat-resistant resin and a carbon fiber strand in a conventional uniaxial or biaxial extruder, kneading and extruding the blend at a cylinder temperature of, for example, 350–400° C., preferably 360–380° C. for PES, 380–430° C., preferably 390–410° C. for PEK, and 360–420° C., preferably 370–390° C. for PEEK and a compression ratio of 2–3 in the screw of the extruder, and cutting off the thus-extruded blend.

The injection molding of the pellets thus obtained can be effected by means of a conventional injection molding machine at a cylinder temperature slightly higher than that described above and a mold temperature of 160–210° C., preferably 180–200° C., so that internal combustion engine parts in complex shapes, for instance, impellers of solid (integral) centrifugal compressors can be easily obtained.

The invention will be described hereunder by reference to the drawings.

FIG. 1 is a drawing illustrating an impeller 1 as an example of the internal combustion engine parts of the invention.

Figure 2:
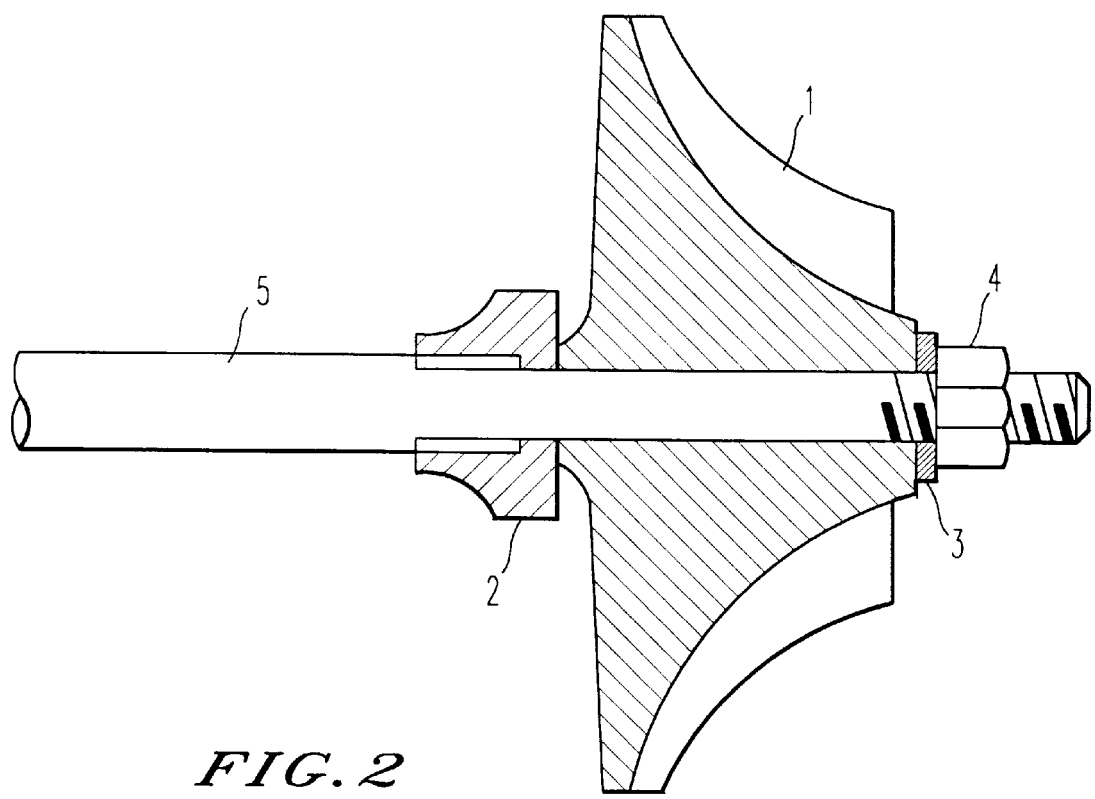
FIG. 2 shows a cross-section of the impeller of FIG. 1 mounted on a shaft.

As is seen from the drawing, the impeller of a centrifugal compressor is of a complex shape and requires a precise dimensional accuracy. As is illustrated in FIG. 2, the impeller 1 is held between a sleeve 2 and a washer 3, and fixed to a shaft part 5 of the centrifugal compressor by a nut 4. The impeller of the invention can be manufactured by a well-known method such as extrusion molding or injection molding from the foregoing resin compositions.

Figure 3:
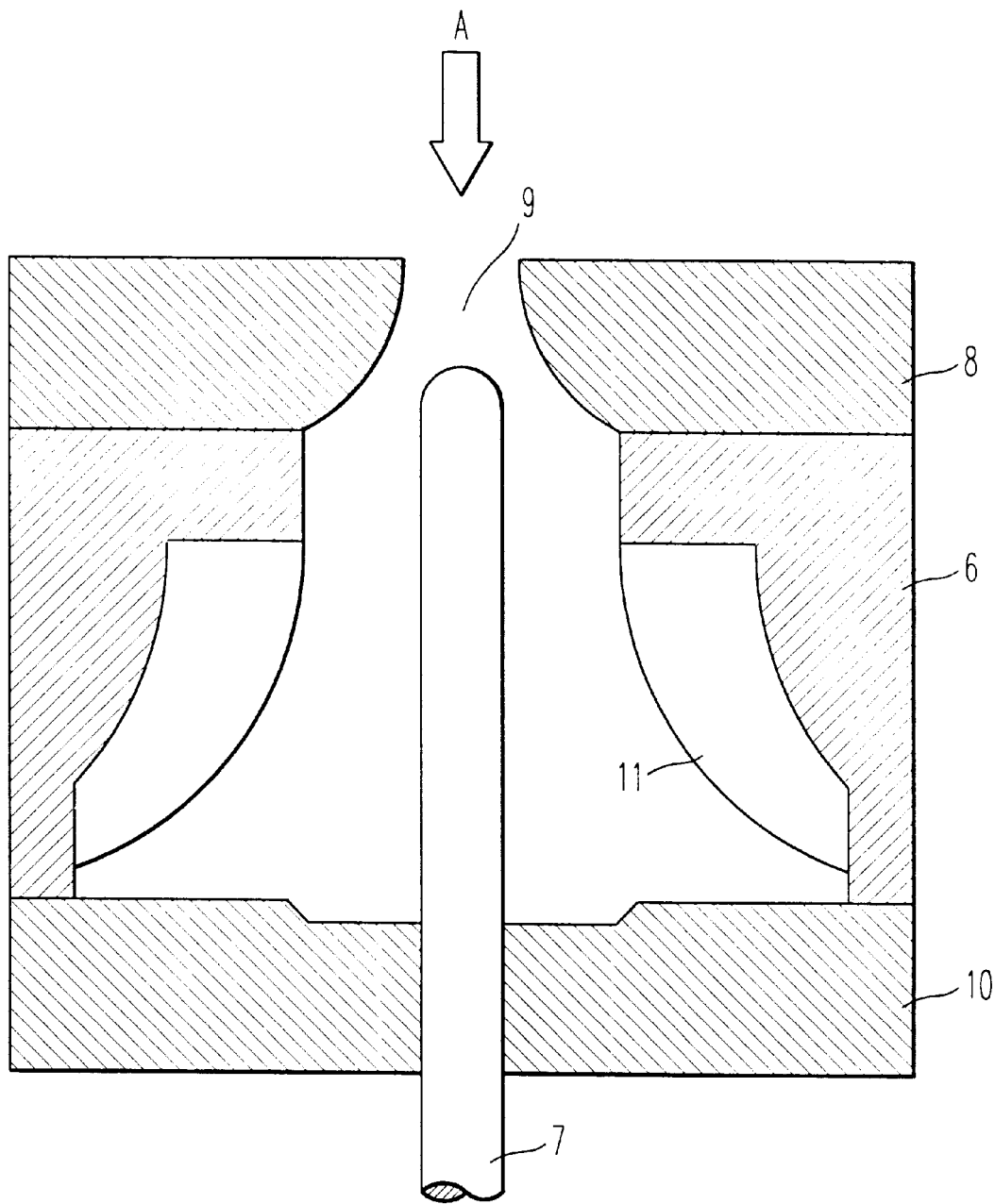
FIG. 3 is a cross-section of a mold for the impeller.

For example, an impeller can be molded by the use of a mold given in FIG. 3. Specifically, a pin 7 is fixed in a lower mold 10 combined with a built-up mold 6 with an impeller shape carved. Then, an upper mold 8 is fixed thereon intimately, so that a molding material is injected or extruded through a gate 9 from the A direction to fill it in the impeller forming section (cavity section) 11, thereby molding the impeller.

(EXAMPLE)

The invention will be illustrated by the following Examples and Comparative Examples.

Examples 1–3

A polyether sulfone solution consisting of 20% by weight of "VICTREX Polyether Sulfone PES 5003P (trade name)" of Imperial Chemical Industries Ltd., 40% by weight of dichloromethane and 40% by weight of 1,1,2-trichloroethane was prepared. A roving of an acrylic-origin carbon fiber with its surface oxidized (tradenamed HTA; manufactured by Toho Rayon Co.; this product was used in the following Examples and Comparative Examples as the carbon fiber unless otherwise specified) was immersed continuously in the polyether sulfone solution at a rate of 60 m/hr. The resulting roving was dried, removed with the solvents, and then cut off to a length of 3 mm to prepare a chopped strand.

The amount of the aromatic polyether sulfone resin fixed was 5% by weight based on the carbon fiber.

The carbon fiber chopped strand was put in a vat made of stainless steel and admitted in an electric furnace having been raised in temperature to 350° C., thus undergoing a 10-hour heat treatment in an atmosphere of air. The carbon fiber chopped strand thus obtained was dry-blended with PEEK 450P, a heat-resistant resin made by Imperial Chemical Industries Ltd., in the proportion given in Table 1. While being molten and kneaded, the resultant blend was extruded at a temperature of 380° C. by an extruder with a diameter of 40 mm to obtain uniformly blended pellets.

The uniformly blended pellets were formed into a dumb-bell test specimen by means of a conventional injection molding machine under the conditions of a cylinder temperature of 380° C. and a mold temperature of 180° C. The tensile strength of the specimen was measured at a temperature of 23° C. and a tensile rate of 5 mm/min. The result is given in Table 1. The measuring conditions of the tensile strength in the following Examples and Comparative Examples are the same as those in this Example unless otherwise specified.

Comparative Examples 1–3

A dumb-bell test specimen made of a carbon fiber-blended PEEK resin was prepared in the same manner as in Example 1, except for the use of an acrylic-origin carbon fiber bound with an epoxy resin in place of the carbon fiber chopped strand covered with the aromatic polyether sulfone resin and heat-treated used in Examples 1–3. The tensile strength of the specimen was measured, and the result is given in Table 1.

Comparative Examples 4–6

A dumb-bell specimen made of a carbon fiber-blended PEEK resin was prepared in the same manner as in Examples 1–3, except for the use of an acrylic-origin carbon fiber bound with an aromatic polyether sulfone resin in place of the carbon fiber chopped strand covered with the aromatic polyether sulfone resin and heat-treated used in Example 1–3. The tensile strength of the specimen was measured, and the result is given in Table 1.

Example 4

A dry blend, comprising 30% by weight of the carbon fiber chopped strand covered with the aromatic polyether sulfone resin and heat-treated, which was obtained in Example 1, and 70% by weight of PES 4100P, a PES made by Imperial Chemical Industries Ltd., was extruded, while being molten and kneaded, at a temperature of 360° C. by an extruder with a diameter of 40 mm to obtain uniformly blended pellets. The uniformly blended pellets were formed into a dumb-bell test specimen by means of a conventional injection molding machine under the conditions of a cylinder temperature of 380° C. and a mold temperature of 170° C. The tensile strength of the specimen was measured and the result is given in Table 1.

Comparative Example 7

A dumb-bell test specimen made of a carbon fiber-blended PES resin was prepared in the same manner as in Example 4 by the use of a carbon fiber made in the manner as in Example 4 except that the heat treatment was omitted. The tensile strength of the specimen was measured, and the result is given in Table 2.

Example 5

A dry blend, comprising 30% by weight of the carbon fiber chopped strand covered with the aromatic polyether sulfone resin and heat-treated, which was obtained in Example 1, and 70% by weight of ULTEM 1000 (trade name), a PEI made by GE Company was extruded, while being molten and kneaded, at a temperature of 380° C. by an extruder with a diameter of 40 mm to obtain uniformly blended pellets. The uniformly blended pellets were formed into a dumb-bell test specimen by means of a conventional injection molding machine under the conditions of a cylinder temperature of 380° C. and a mold temperature of 160° C. The tensile strength of the specimen was measured, and the result is given in Table 2.

Comparative Example 8

A dumb-bell test specimen made of a carbon fiber-blended PEI resin was prepared in the same manner as in Example 5 by use of a carbon fiber made in the same manner as in Example 5 except that the heat treatment was omitted. The tensile strength of the specimen was measured, and the result is given in Table 2.

Example 6

A dry blend, comprising 30% by weight of the carbon fiber chopped strand covered with the aromatic polyether sulfone resin and heat-treated, which was obtained in Example 1, and 70% by weight of Ryton P-4 (trade name), a PPS made by Phillips Petroleum Co., was extruded, while being molten and kneaded, at a temperature of 340° C. by an extruder with a diameter of 40 mm to obtain uniformly blended pellets. The uniformly blended pellets were formed into a dumb-bell test specimen by means of a conventional injection molding machine under the conditions of a cylinder temperature of 360° C. and a mold temperature of 120° C. The tensile strength of the specimen was measured, and the result is given in Table 2.

Comparative Example 9

A dumb-bell test specimen made of a carbon fiber-blended PPS resin was prepared in the same manner as in Example 6 by the use of a carbon fiber made in the same manner as in Example 6 except that the heat treatment was omitted. The tensile strength of the specimen was measured, and the result is given in Table 2.

Comparative Example 10

A dumb-bell test specimen was prepared in the same manner as in Example 4 except that the heat treatment temperature of the chopped strand of the carbon fiber was changed to 250° C. in Example 4. The tensile strength of the specimen was measured and found to be 1,750 kg/cm$^2$.

Comparative Example 11

A dumb-bell test specimen was prepared in the same manner as in Comparative Example 10 except that the carbon fiber chopped strand covered with the aromatic polyether sulfone resin was introduced in an electric furnace having been raised in temperature to 450° C. where they were heat-treated for 10 hours in an atmosphere of air. The tensile strength of the specimen was measured and found to be 1,840 kg/cm$^2$.

Example 7

A polysulfone solution consisting of 20% by weight of "Udel Polysulfone P-1700 (trade name)" of Amoco Performance Products Inc., USA and 80% by weight of N-methyl-pyrrolidone was prepared. A roving of an acrylic-origin carbon fiber with its surface oxidized as immersed continuously in the polysulfone solution at a rate of 60 m/hr. The resulting roving was dried, removed with the solvent, and then cut off to a length of 3 mm to prepare a chopped strand.

The amount of the aromatic polyether sulfone resin fixed was 5% by weight based on the carbon fiber.

The carbon fiber chopped strand was heat-treated under the same conditions as in Examples 1–3. Using the resultant chopped strand, a dumb-bell test specimen made of a carbon fiber-blended PEEK resin was prepared in the same manner as in Example 2. The tensile strength of the specimen was measured and found to be 2,310 kg/cm$^2$.

TABLE 1

| | | Composition | | | | |
|---|---|---|---|---|---|---|
| | | Heat-resistant resin | | Carbon fiber | | Tensile |
| | | Kind | Proportion (wt. %) | Binder kind | Heat treatment (° C./hr) | Proportion (wt. %) | strength (kg/cm$^2$) |
| Example | 1 | PEEK 450P | 80 | PES | 350/10 | 20 | 2080 |
| | 2 | PEEK 450P | 70 | PES | 350/10 | 30 | 2410 |
| | 3 | PEEK 450P | 60 | PES | 350/10 | 40 | 2760 |
| Comp. | 1 | PEEK 450P | 80 | Epoxy resin | — | 20 | 1750 |
| Example | 2 | PEEK 450P | 70 | Epoxy resin | — | 30 | 1860 |
| | 3 | PEEK 450P | 60 | Epoxy resin | — | 40 | 2180 |
| | 4 | PEEK 450P | 80 | PES | — | 20 | 1740 |
| | 5 | PEEK 450P | 70 | PES | — | 30 | 1990 |
| | 6 | PEEK 450P | 60 | PES | — | 40 | 2230 |

TABLE 2

| | | Composition | | | | |
|---|---|---|---|---|---|---|
| | | Heat-resistant resin | | Carbon fiber | | Tensile |
| | | Kind | Proportion (wt. %) | Binder kind | Heat treatment (° C./hr) | Proportion (wt. %) | strength (kg/cm$^2$) |
| Example | 4 | PEEK 4100P | 70 | PES | 350/10 | 30 | 2260 |
| | 5 | PEI 1000 | 70 | PES | 350/10 | 30 | 2360 |
| | 6 | PPS P-4 | 70 | PES | 350/10 | 30 | 2230 |
| Comp. | 7 | PES 4100P | 70 | PES | — | 30 | 1870 |
| Ex. | 8 | PEI 1000 | 70 | PES | — | 30 | 1950 |
| | 9 | PPS P-4 | 70 | PES | — | 30 | 1840 |

Example 8

A polyacrylonitrile-origin carbon fiber with its surface treated by electrolytic oxidation (Type HTA; manufactured by Toho Rayon Co.) was bound with a polyether sulfone binder, which had been prepared by dissolving a low molecular polyether sulfone resin having hydroxyl groups at its (unit) terminals (5003P: manufactured by Mitsui Toatsu Chemicals Inc.) in a solvent N-methyl-pyrrolidone to a resin content of 10–30% by weight and diluting the resulting solution with xylene. The strand thus-obtained was cut off to a length of 6 mm to obtain a chopped fiber, which was heat-treated in a heat treating furnace in an atmosphere of air under the various conditions given in Table 3.

Then, each group of the chopped carbon fiber thus-treated was blended with a polyether sulfone resin (4100G: manufactured by Mitsui Toatsu Chemicals Inc.) used as the matrix resin to the carbon fiber content of 30% by weight.

Figure 4:
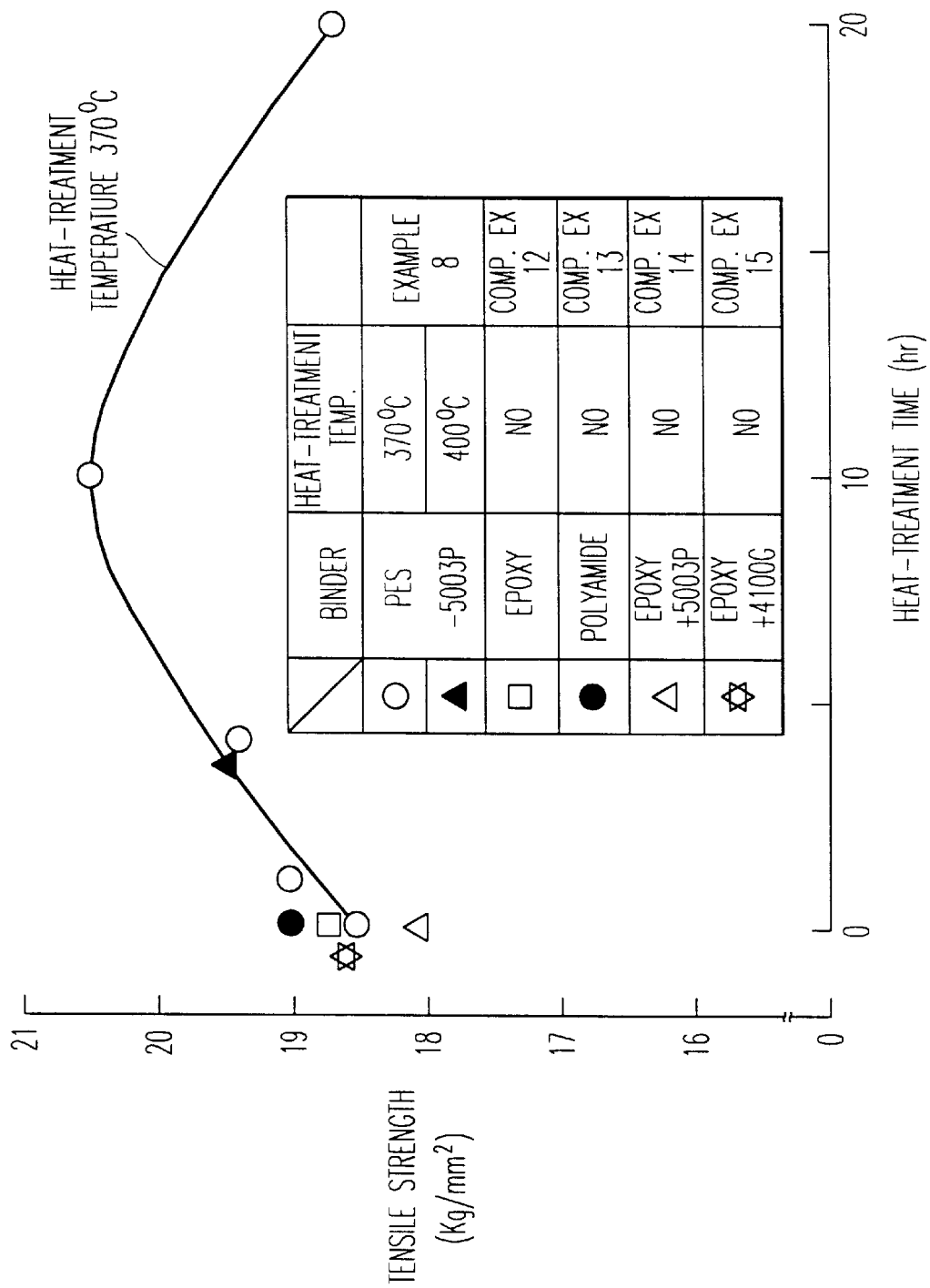
FIGS. 4, 7 and 10 are individually a curve showing the relationship between the heat treatment time of a carbon fiber used for fabricating the impeller of the invention and the tensile strength corresponding to the treatment time, the matrix resins being PES, PEK and PEEK for FIGS. 4, 7 and 10, respectively.

Each blend was extruded by means of a uniaxial vent-type extruder with a diameter of 65 mm, of which the L/D was 23 and the compression ratio was 3, at a cylinder temperature of 370° C. and a screw speed of 45 rpm. The resulting strand was cut off to obtain a molding material as pellets. The pellets were dried with hot air at 180° C. for 5 hours, and thereafter formed into a ASTM No. 1 dumb-bell test specimen with 3 mm thickness by the use of a 75-ton (mold damping force) injection molding machine made by Japan Steel Works at a cylinder temperature of 370° C. and a mold temperature of 160° C. The specimens thus-obtained were submitted to tensile tests. The results are given in Table 3 coupled with those in which the heat treatment was conducted at 400° C. and those in which the heat treatment was omitted (blank). The relationship between the heat treating time of the samples and the tensile strength in this Example is shown in FIG. 4.

TABLE 3

| Carbon Fiber Heat-Treatment Conditions and Tensile Strength | | | | | | |
|---|---|---|---|---|---|---|
| | | Temperature (° C.) | | | | |
| | | 370 | | | | 400 |
| | | Time (hr) | | | | |
| Property | Blank | 1 | 4 | 10 | 20 | 4 |
| Tensile strength (kg/min$^2$) | 18.5 | 19.0 | 19.4 | 20.5 | 18.6 | 19.4 |
| Elongation (%) | 1.9 | 1.6 | 1.7 | 1.9 | 1.3 | 1.4 |
| Elastic modulus (kg/mm$^2$) | 1670 | 1940 | 1990 | 2050 | 2340 | 2320 |

Figure 5:
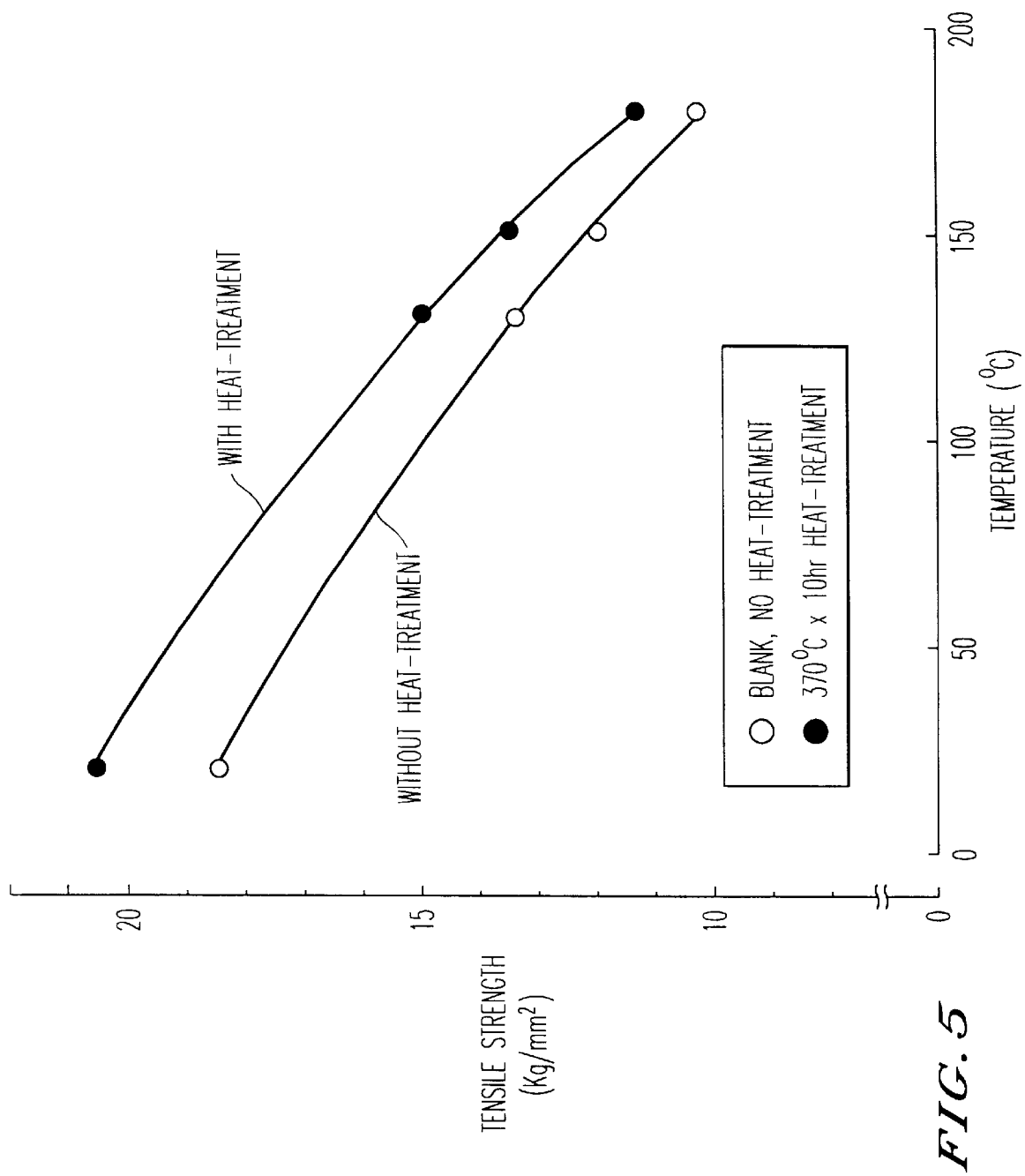
FIGS. 5, 8 and 11 are individually a curve showing the temperature dependence of the tensile strength with or without heat treatment of the carbon fiber, the matrix resins being PES, PEK and PEEK for FIGS. 5, 8 and 11, respectively.

As regards the heat treating temperature and time, the most suitable regions are in around 370° C. and 10 hours, in particular. Thus, the material using the carbon fiber heat-treated at 370° C. for 10 hours was molded into ASTM No. 1 dumb-bell test specimens. Using the specimens, the temperature dependence of the tensile strength was investigated. The results are summarized in FIG. 5 together with the results of blank.

Then, the molding material using the above-described carbon fiber heat-treated at 370° C. for 10 hours was injected into a mold with the structure as illustrated in FIG. 3 under the molding conditions of a cylinder temperature of 380° C., a mold temperature of 200° C. and an injection pressure of 1,600 kg/cm², thereby obtaining impeller-shaped products. The thus-obtained products were removed with burrs and subjected to machining operations including balance check. Then, each product was fixed onto a shaft in the structure as shown in FIG. 2 and mounted on a high speed rotating strength testing machine (number of revolution: $0-25 \times 10^4$ rpm) equipped with an air heater (temperature range: 0–600° C.). Burst tests ($13 \times 10^4$ rpm, 60 min.) were thus carried out at different temperatures while maintaining the number of revolution at $13 \times 10^4$ rpm. Further, according to the short-cut method for determining whether an impeller can stand a continuous endurance test of 200 hours at $13 \times 10^4$ rpm, it is necessary to clear the bar of at least 200,000 rpm in the instant burst number of revolution at room temperature. Therefore, this test ($20 \times 10^4$ rpm, 5 sec.) was also conducted. The results thus obtained are shown in Table 4.

Comparative Example 12

A pellety resin composition was prepared by blending a carbon fiber (HTA-C6E; manufactured by Toho Rayon Co.; epoxy-type binder) with a polyether sulfone resin (4100G; manufactured by Mitsui Toatsu Chemicals Inc.) to the carbon fiber content of 30% by weight. The resin composition was formed into a ASTM No. 1 dumb-bell test specimen with 3 mm thickness at a cylinder temperature of 370° C. and a mold temperature of 160° C. Using the specimen, a tensile test was conducted. The result is given in FIG. 4 together with the results of Example 8. Then, the resin composition was injected into a mold with the structure as illustrated in FIG. 3 under the molding conditions of a cylinder temperature of 380° C., a mold temperature of 200° C. and an injection pressure of 1,600 kg/cm², thus obtaining impeller-shaped products. Therefore, the products were subjected to machining operations and tests in the same manner as described in Example 8. The results are summarized in Table 4.

Comparative Example 13

A chopped carbon fiber bound with a polyamide-type binder (HTA-C6N; manufactured by Toho Rayon Co.) was blended with a polyether sulfone resin (4100G; manufactured by Mitsui Toatsu Chemicals Inc.) to the carbon fiber content of 30% by weight, thus preparing a pellety resin composition. Using the resin composition, tests were conducted in much the same manner as described in Comparative Example 12. The results are given in FIG. 4 and Table 4.

Comparative Example 14

A continuous carbon fiber bound with an epoxy-type binder (HTA-type; manufactured by Toho Rayon Co.) was burned (baked) once to reduce the content of the binder to 0.3–1.5% by weight on the surface of the carbon fiber. A polyether sulfone resin (5003P; manufactured by Mitsui Toatsu Chemicals Inc.) was coated on the continuous carbon fiber as a binder. The resultant carbon fiber was cut off to a length of 6 mm to prepare a chopped carbon fiber, which was then blended with a polyether sulfone resin (4100G; manufactured by Mitsui Toatsu Chemicals Inc.) used as the matrix resin so that the chopped carbon fiber content was 30% by weight, whereby a pellety resin composition was prepared. Using the resin composition, tests were conducted in the same manner as described in Comparative Example 12. The results are given in FIG. 4 and Table 4.

Comparative Example 15

A continuous carbon fiber bound with an epoxy binder (HTA-type; manufactured by Toho Rayon Co.) was burned (baked) once to reduce the content of the binder to 0.3–1.5% by weight on the surface of the carbon fiber. A polyether sulfone resin (4100G; manufactured by Mitsui Toatsu Chemicals Inc.) was coated on the continuous carbon fiber as a binder. The resultant carbon fiber was cut off to a length of 6 mm to prepare a chopped carbon fiber, which was then blended with a polyether sulfone resin (4100G; manufactured by Mitsui Toatsu Chemicals Inc.) used as the matrix resin so that the chopped carbon fiber content was 30% by weight, whereby a resin composition was prepared as pellets. Using the resin composition, tests were conducted in the same manner as described in Comparative Example 12. The results are given in FIG. 4 and Table 4.

Example 9

Figure 6:
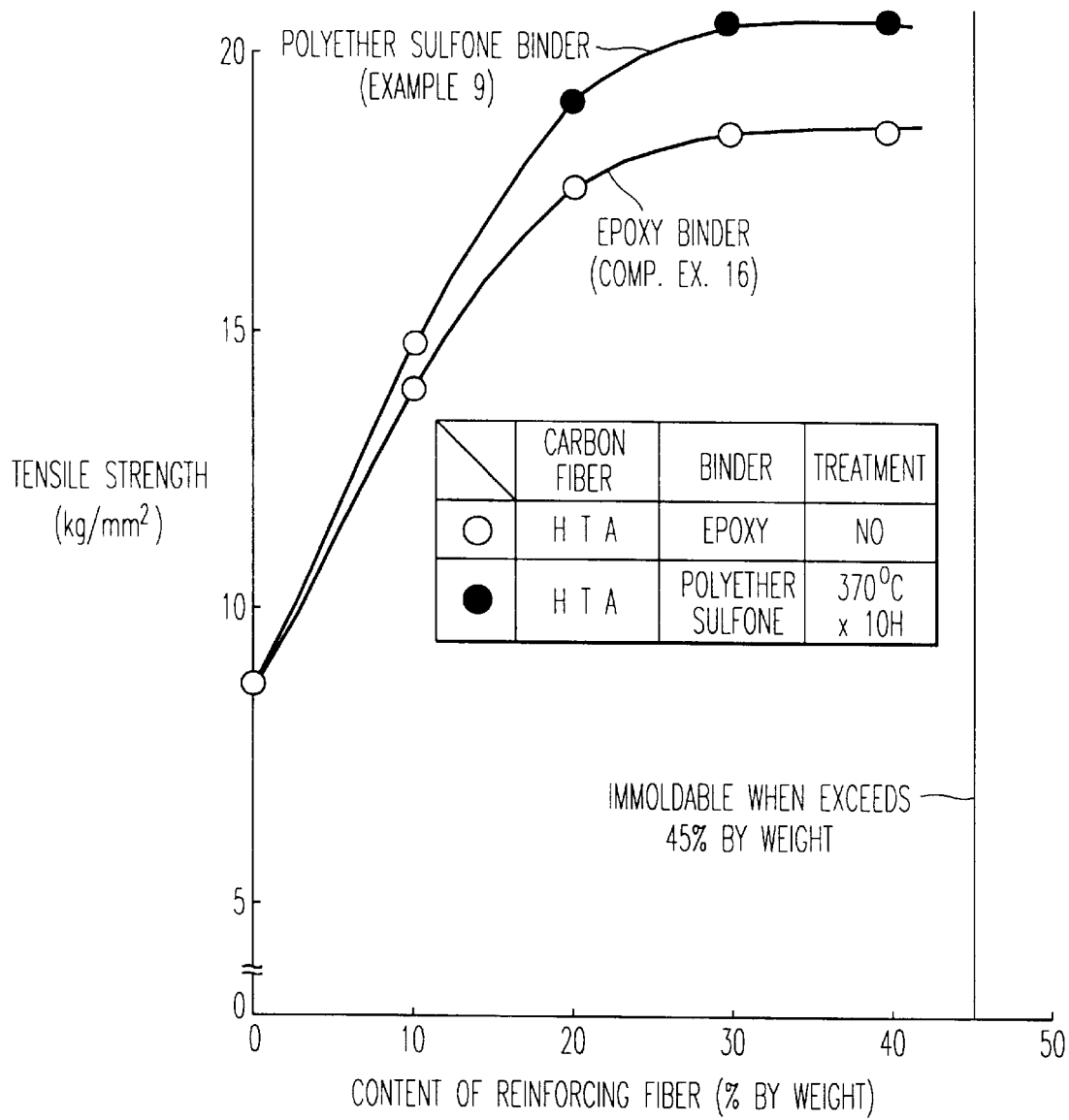
FIGS. 6, 9 and 12 are individually a curve showing the relationship between the content of the reinforcing fiber and the tensile strength in the case of using a carbon fiber without heat treatment and the carbon fiber (with heat treatment) of the invention, the matrix resins being PES, PEK and PEEK for FIGS. 6, 9 and 12, respectively.

A low molecular polyether sulfone resin with hydroxyl groups at its (unit) terminals (5003P; manufactured by Mitsui Toatsu Chemicals Inc.) was dissolved in a solvent N-methyl-pyrrolidone to a resin content of 10–30% by weight and then dilluted with xylene to prepare a polyether sulfone type binder. A polyacrylonitrile-origin carbon fiber with its surface treated by electrolytic oxidation (HTA-type; manufactured by Toho Rayon Co.) was bound with this binder. The resultant strand was cut off to a length of 6 mm to prepare a chopped fiber, which was treated in a heat treating furnace at 370° C. for 10 hours in an atmosphere of air. Then, a polyether sulfone resin (4100G; manufactured by Mitsui Toatsu Chemicals Inc.) as the matrix resin was blended with the chopped carbon fiber treated as described above so as to attain the carbon fiber contents of 10, 20, 30, 40 and 50% by weight, thus preparing pellety resin compositions. Using the resin compositions, tests were made in the same manner as described in Comparative Example 12. The results are given in FIG. 6. Then, of these resin compositions, only the composition containing 30% by weight of the carbon fiber was injected into a mold with the structure as illustrated in FIG. 3 under the molding conditions of a cylinder temperature of 380° C., a mold temperature of 200° C. and an injection pressure of 1,600 kg/cm to prepare impeller-shaped products. The products were subjected to machining operations and then to burst tests in the same manner as described in Example 8. The results are shown in Table 4.

Comparative Example 16

A polyether sulfone resin (4100G; manufactured by Mitsui Toatsu Chemicals Inc.) was blended with a carbon fiber (HTA-C6E; manufactured by Toho Rayon Co.; epoxy-type binder) so as to attain the carbon fiber contents of 10–40% by weight, thereby preparing resin compositions as pellets. The resin compositions were formed into ASTM No. 1 dumb-bell test specimens with 3 mm thickness at a cylinder temperature of 370° C. and a mold temperature of 160° C. The specimens were submitted to tensile tests. The results are summarized in FIG. 6 coupled with the results of Example 9.

Then, of these resin compositions, only the composition containing 30% by weight of the carbon fiber was injected into a mold with the structure as illustrated in FIG. 3 under the molding conditions of a cylinder temperature of 380° C., a mold temperature of 200° C. and an injection pressure of 1,600 kg/cm² to obtain impeller-shaped products. The products were subjected to machining operation and then to burst tests in the same manner as described in Example 8. The results are summarized in Table 4.

TABLE 4

|  | Condtn. | | |
|---|---|---|---|
|  | Burst test (13 × 10⁴ rpm) | | Burst test (20 × 10⁴ rpm) |
|  | Temp. | | |
|  | Room temp. | 100° C. | Room temp. |
| Example 8 | ○ | ○ | ○ |
| Comp. Ex. 12 | ○ | X | X |
| Comp. Ex. 13 | X | X | X |
| Comp. Ex. 14 | ○ | X | X |
| Comp. Ex. 15 | ○ | X | X |
| Example 9 | ○ | ○ | ○ |
| Comp. Ex. 16 | ○ | X | X |

(Note)
○: Success: without burst
X: Fail: burst

Example 10

Figure 7:
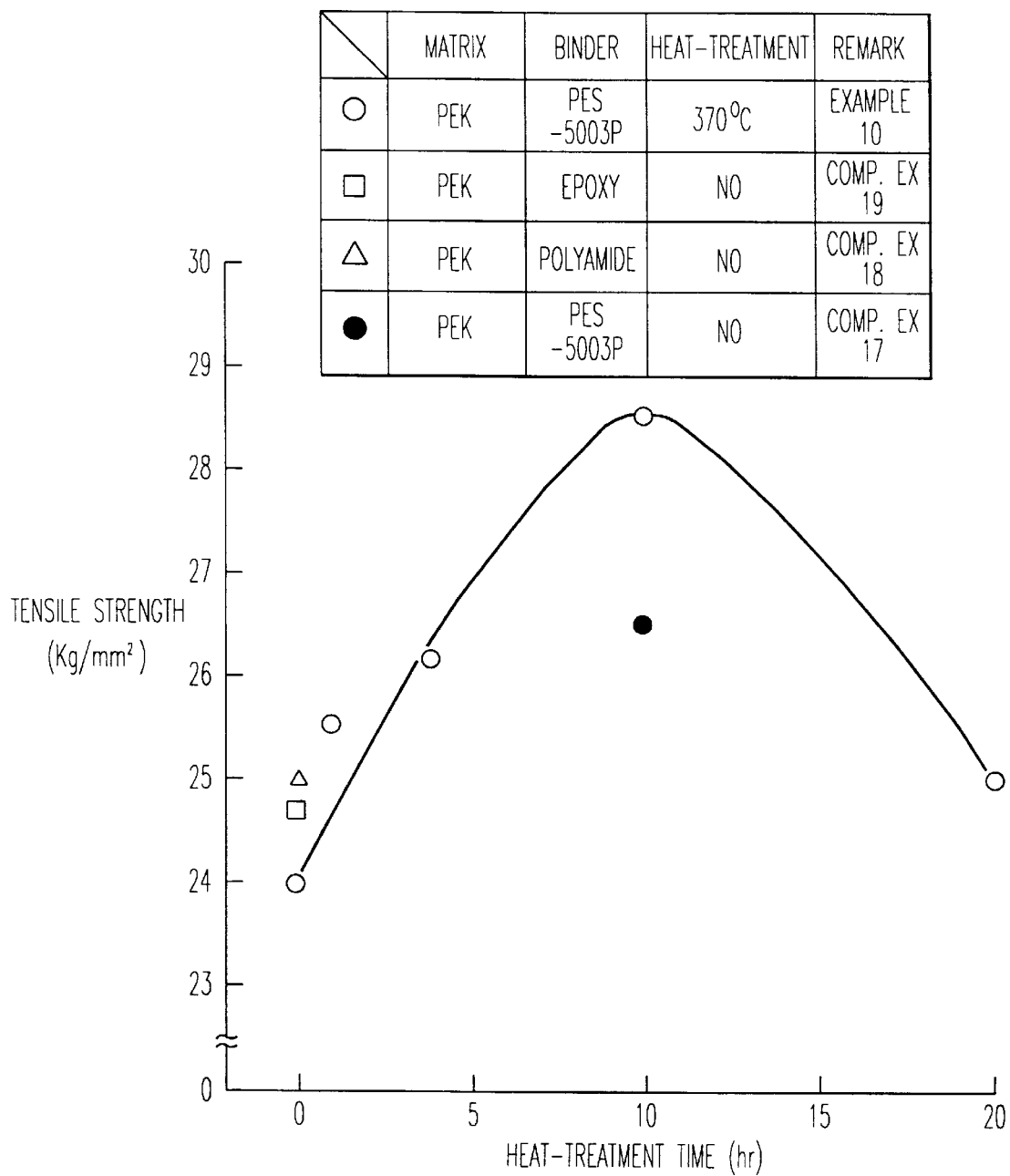

Resin compositions with the carbon fiber content of 30% by weight were prepared in the same manner as in Example 8 except for the use of a polyether ketone resin [VICTREX (PEK); manufactured by ICI Ltd.] as the matrix resin. The resin compositions were extruded by means of a uniaxial vent-type extruder with a diameter of 65 mm, of which the L/D was 23 and the compression ratio was 3, at a cylinder temperature of 390° C. and a screw speed of 45 rpm. The resulting each strand was cut off to obtain a molding material as pellets. The material was dried with hot air at 180° C. for 5 hours and formed into a JIS No. 1 dumb-bell test specimen with 3 mm thickness by means of a 75-ton (mold clamping force) injection molding machine made by Japan Steel Works at a cylinder temperature of 420° C. and a mold temperature of 180° C. The specimens thus obtained were subjected to tensile tests. The results are given in Table 5 and FIG. 7.

TABLE 5

Carbon Fiber Heat-Treatment Conditions and Tensile strength

| Property | Treatmt. | | | | |
|---|---|---|---|---|---|
|  | Blank (no heat-treatmt.) | 370°0 C. | | | |
|  |  | 1 Hr | 4 Hr | 10 Hr | 20 Hr |
| Tensile strength (kg/mm²) | 24.0 | 25.5 | 26.1 | 28.5 | 25.0 |

Figure 8:
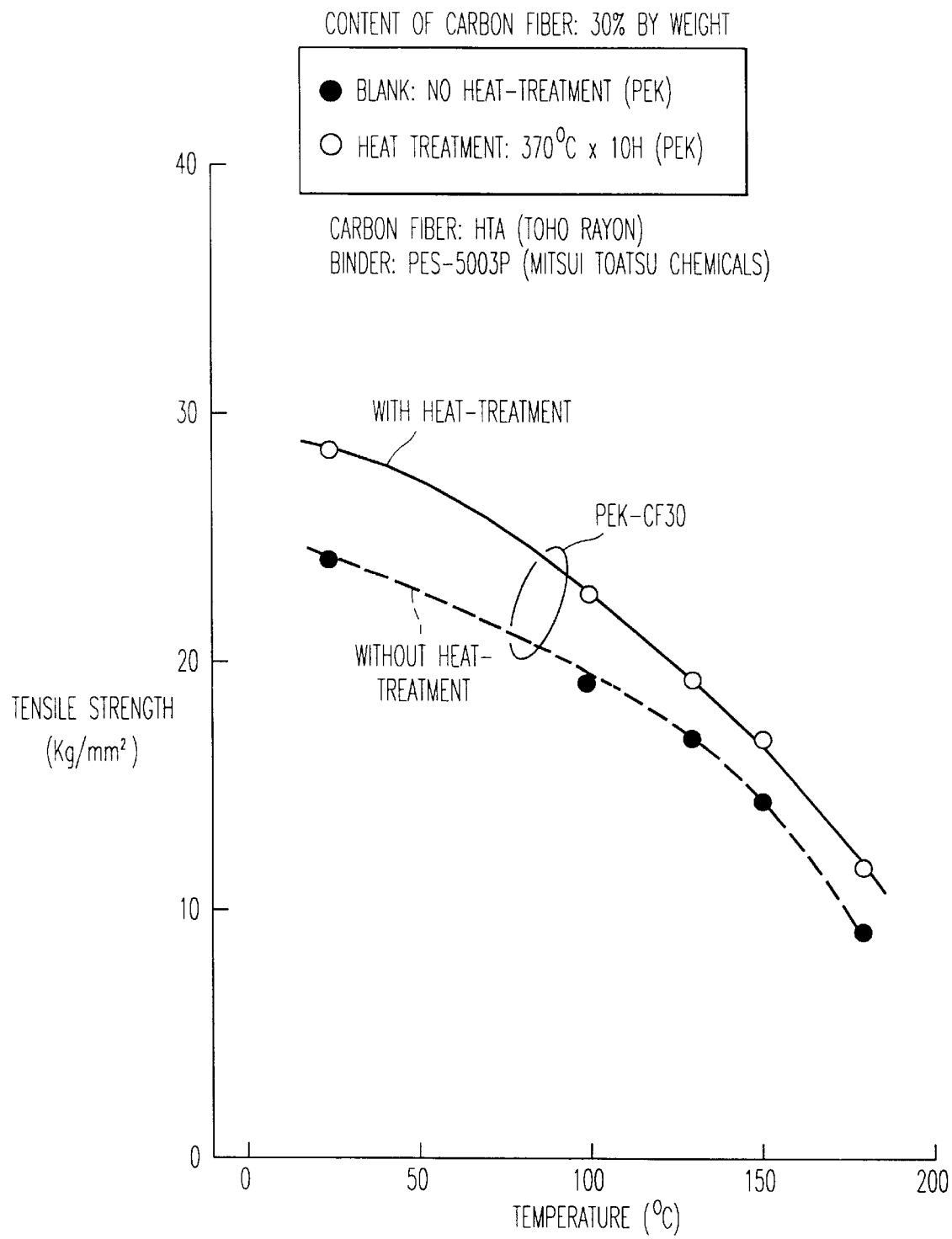

In view of the correlation with the heat treating temperature and time of the carbon fiber applied with the binder, the most suitable regions are in around 370° C. and 10 hours, in particular. Thus, the molding material using the carbon fiber heat-treated at 370° C. for 10 hours was molded into JIS No. 1 dumb-bell test specimens. Using the specimens, the temperature dependence of the tensile strength was investigated. The results are given in FIG. 8.

Then, said molding material using the carbon fiber heat-treated at 370° C. for 10 hours was injected into a mold with the structure as illustrated in FIG. 3 under the molding conditions of a cylinder temperature of 400° C., a mold temperature of 180° C. and an injection pressure of 2,000 kg/cm², thus obtaining impeller shaped products. The resultant products were removed with burrs and subjected to machining operations including balance check. Then, they were independently fixed onto a shaft in the structure as shown in FIG. 2, and subjected to burst tests under the same conditions as in Example 8. The results obtained are given in Table 6.

Comparative Example 17

A polyacrylonitrile-origin carbon fiber with its surface treated by electrolytic oxidation (HTA-type; manufactured by Toho Rayon Co.) was bound with a polyether sulfone-type binder, which had been prepared by dissolving a low molecular polyether sulfone resin with hydroxyl groups at its (unit) terminals (5003P; manufactured by Mitsui Toatsu Chemicals Inc.) to a mixing proportion of the resin of 10–30% by weight to the solvent and diluting the resulting solution with xylene. The strand thus formed was cut off to a length of 6 mm to prepare a chopped carbon fiber.

This carbon fiber was blended with a polyether ketone resin [VICTREX (PEK); manufactured by ICI Ltd.] as the matrix resin so as to attain the carbon fiber content of 30% by weight.

The resin composition was extruded by the use of a uniaxial vent-type extruder under the same conditions as described in Example 10 to obtain a pellety molding material. Using the molding material, tests were made in the same manner as described in Example 10. The results are summarized in Table 6.

Comparative Example 18

A chopped carbon fiber bound with a polyamide-type binder (HTA-C6N; manufactured by Toho Rayon Co.) was blended with a polyether ketone resin [VICTREX (PEK); manufactured by ICI Ltd.] to the carbon fiber content of 30% by weight, thereby obtaining a resin composition as pellets. Using the resin composition, tests were made in much the same manner as described in Comparative Example 17. The results are given in FIG. 7 and Table 6.

Comparative Example 19

A chopped carbon fiber bound with an epoxy-type binder (HTA-C6E; manufactured by Toho Rayon Co.) and a polyether ketone resin [VICTREX (PEK); manufactured by ICI Ltd.] were blended with each other to the carbon fiber content of 30% by weight, thereby obtaining a pellety resin composition. Using the resin composition, tests were made in much the same manner as described in Comparative Example 17. The results are given in FIG. 7 and Table 6.

Example 11

Figure 9:
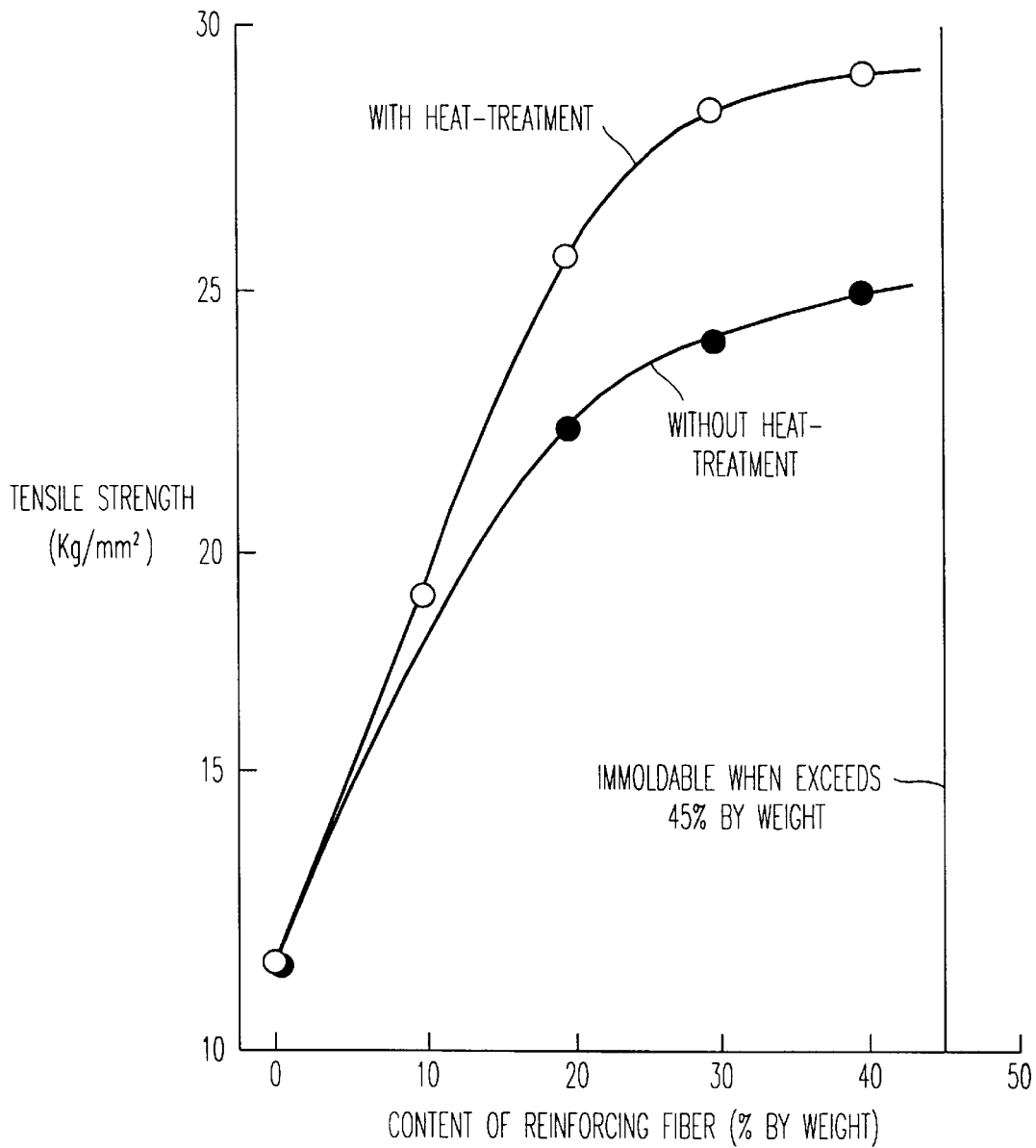

A low molecular polyether sulfone resin with hydroxyl groups at its (unit) terminals (5003P; manufactured by Mitsui Toatsu Chemicals Inc.) was dissolved in a solvent N-methyl pyrrolidone to a resin content of 10–30% by weight and then diluted with xylene to prepare a polyether sulfone type binder. A polyacrylonitrile-origin carbon fiber with its surface treated by electrolytic oxidation (HTA-type; manufactured by Toho Rayon Co.) was bound with the binder. The resulting strand was cut off to a length of 6 mm to prepare a chopped carbon fiber, which was treated at 370° C. for 10 hours in a heat treating furnace in an atmosphere of air. Then, a polyether ketone resin [VICTREX (PEK); manufactured by ICI Ltd.] and the carbon fiber treated as described above were blended with each other to the carbon fiber contents of 10, 20, 30, 40 and 50% by weight, whereby resin compositions were prepared as pellets. Using the resin compositions, tests were made in the same manner as described in Comparative Example 17. The results are shown in FIG. 9. Then, of these resin compositions, only the composition containing 40% by weight of the carbon fiber was injected into a mold with the structure as illustrated in FIG. 3 under the molding conditions of a cylinder temperature of 410° C., a mold temperature of 200° C. and an injection pressure of 2,100 kg/cm², thus obtaining impeller-shaped products. Thereafter, the products were subjected to machining operations and then to burst tests in the same manner as described in Example 8. The results are given in Table 6.

Comparative Example 20

A low molecular polyether sulfone resin with hydroxyl groups at its (unit) terminals (5003P; manufactured by Mitsui Toatsu Chemicals Inc.) was dissolved in a solvent N-methyl-pyrrolidone to a resin content of 10–30% by weight and then diluted with xylene to prepare a polyether sulfone type binder. With the binder was bound a polyacrylonitrile-origin carbon fiber with its surface treated by electrolytic oxidation (HTA-type; manufactured by Toho Rayon Co.). The resulting strand was cut off to a length of 6 mm to provide a chopped carbon fiber. Thereafter, a polyether ketone resin [VICTREX (PEK); manufactured by ICI Ltd.] as the matrix resin was blended with the aforesaid carbon fiber to the carbon fiber contents of 20, 30 and 40% by weight, thereby preparing resin compositions as pellets. Using the resin compositions, tests were conducted equally to those described in Comparative Example 17. The results are given in FIG. 9.

Further, among these resin compositions, only the composition whose carbon fiber content was 30% by weight was molded under the same conditions as described in Example 11. The resultant products were subjected to machining operations and to burst tests. The results are given in Table 6.

TABLE 6

Burst Test Result

| | Condtn. | | |
|---|---|---|---|
| | Burst test (13 × 10⁴ rpm) | | Burst test (20 × 10⁴ rpm) |
| | Temp. | | |
| | Room temp. | 100° C. | Room temp. |
| Example 10 | ○ | ○ | ○ |
| Comp. Ex. 17 | ○ | Δ | ○ |
| Comp. Ex. 18 | X | X | X |
| Comp. Ex. 19 | ○ | X | X |
| Example 11 | ○ | ○ | ○ |
| Comp. Ex. 20 | ○ | Δ | ○ |

(Note)
Burst tests were conducted at 13 × 10⁴ rpm for 20 hours and at 20 × 10⁴ rpm for 5 seconds and the results were compared.
○: Success: without burst (stable and not bursted)
Δ: Semi-success: some were successful but unstable
X: Fail: none was successful From the results given in Tables 4 and 6, it can be seen that the impellers molded in the Examples are superior in thermal strength and anti-creep property to those of the Comparative Examples. With the commercially available carbon fibers given in Comparative Examples 12 and 18 (polyamide resin binders) and Comparative Examples 13 and 19 (epoxy resin binders), the test specimens shows relatively good properties (tensile strength) in the comparison of the initial property. However, in the burst tests of the impeller shaped products, they exhibit low strength. This may presumably be ascribed to that since the molding cycles for forming the impellers are longer than those for forming the test specimens, dissociation and gasification of the epoxy resin and polyamide resin binders take place at the molding temperature of 360–420° C. (PES) and 380–430° C. (PEK) to deteriorate the resin molding materials due to the longer stay and thereby to cause the molded products to hold minute voids.

Example 12

A low molecular polyether sulfone resin with hydroxyl groups at its (unit) terminals was dissolved in a solvent N-methyl-pyrrolidone to a resin mixing proportion of 10–30% by weight and then diluted with xylene to prepare a polyether sulfone type binder. With this binder was bound a polyacrylonitrile-origin carbon fiber with its surface treated by electrolytic oxidation (HTA-type; manufactured by Toho Rayon Co.). The resulting strand was cut off to a length of 6 mm to prepare a chopped carbon fiber, which was heat-treated in a heat treating furnace in an atmosphere of air under the various conditions described in Table 7.

Then, a polyether ether ketone resin (PEEK; manufactured by Mitsui Toatsu Chemicals Inc.) as the matrix resin and each chopped carbon fiber treated as described above were blended with each other to the carbon fiber content of 40% by weigth. Each blend was extruded by means of a uniaxial vent-type extruder with a diameter of 65 mm, of which the L/D was 23 and the compression ratio was 3, at a cylinder temperature of 380° C. and a screw speed of 45 rpm. The resulting strands were cut off to prepare molding materials as pellets. The materials were dried with hot air at 150° C. for 5 hours and then molded into JIS No. 1 dumb-bell test specimens with 3 mm thickness at a cylinder temperature of 380° C. and a mold temperature of 180° C. by the use of a 80-ton (mold clamping force) injection molding machine made by Nissei Plastic Industries Co., Ltd. The specimens were subjected to tensile tests. The results are shown in Table 7 and FIG. 10.

TABLE 7

Carbon Fiber Heat-Treatment Conditions and Tensile Strength

| | | Temp. | | | |
|---|---|---|---|---|---|
| | Blank. | 370° C. | | | |
| | (no heat- | Time | | | |
| Property | treatmt.) | 1 H | 4 H | 10 H | 20 H |
| Tensile strength (kg/mm²) | 24.0 | 25.0 | 26.5 | 28.0 | 25.5 |

Figure 11:
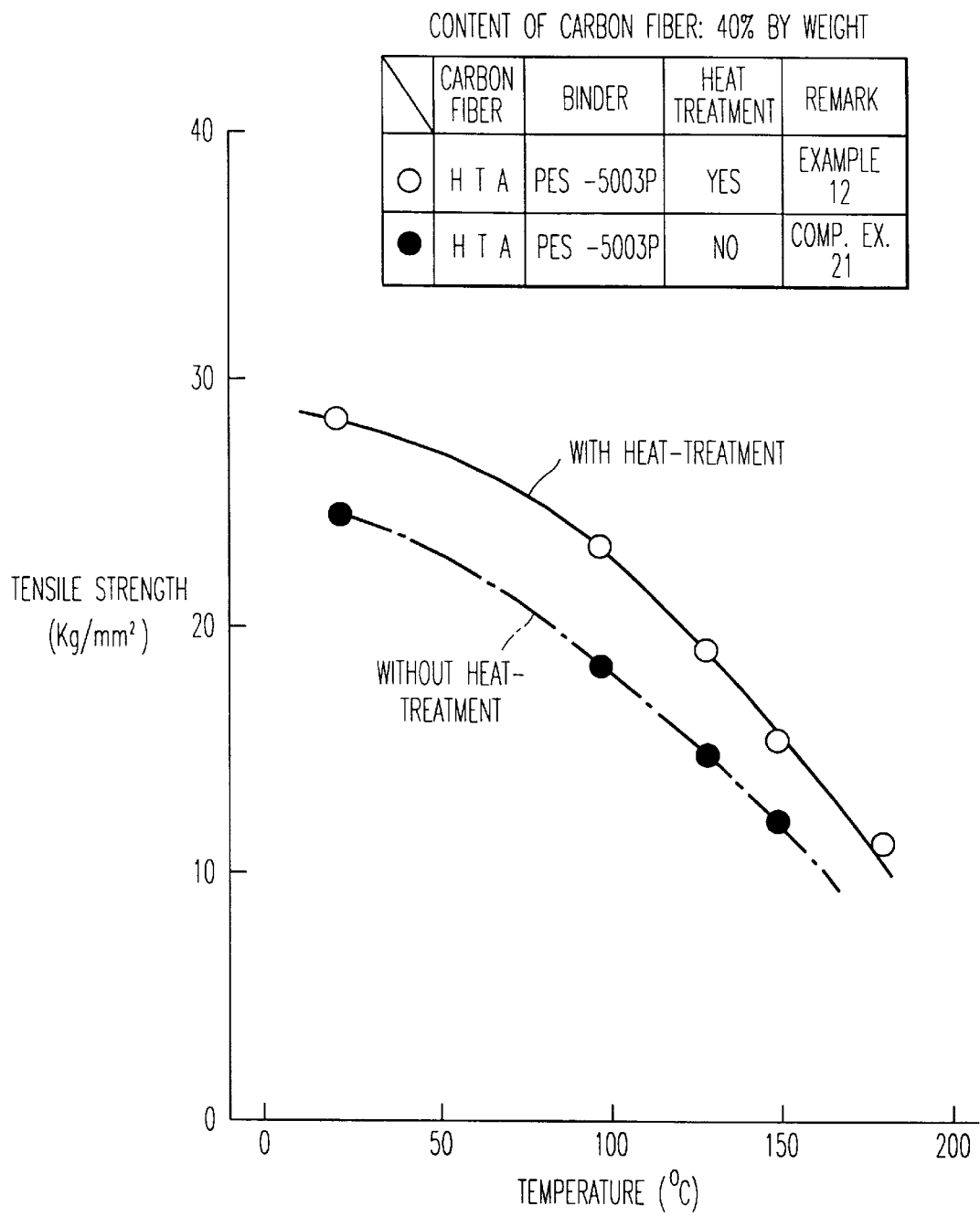

In view of the correlation with the heat treating temperature and time of the carbon fiber bound with the binder, the most suitable regions are in around 370° C. and 10 hours, in particular. Thus, the molding material using the carbon fiber treated with heat at 370° C. for 10 hours was molded into JIS No. 1 dumb-bell test specimens. Using the specimens, the temperature dependence of the tensile strength was investigated. The results are shown in FIG. 11.

Further, the molding material using the carbon fiber treated with heat at 370° C. for 10 hours was injected into a mold with the structure as illustrated in FIG. 3 under the molding conditions of a cylinder temperature of 390° C., a mold temperature of 180° C. and an injection pressure of 2,100 kg/cm² to obtain impeller-shaped products. The resulting products were removed with burrs and subjected to machining operations including balance check. They were then independently fixed onto a shaft in the structure as shown in FIG. 2, and set in a high speed rotating strength testing machine (number of revolution: 0–25×10⁴ rpm) equipped with an air heater (temperature range: 0–600° C.), where they were subjected to burst tests at different temperatures (room temperature, 100° C.) and at a number of revolution of 13×10⁴ rpm. Further, according to the short-cut method for determining whether an impeller can stand a continuous endurance test of 200 hours at 13×10⁴ rpm, it is necessary to clear the bar of at least 20×10⁴ rpm in the instant burst number of revolution at room temperature. Therefore, this test was also conducted. The results thus obtained are shown in Table 8.

Comparative Example 21

A low molecular polyether sulfone resin with hydroxyl groups at its (unit) terminals (5003P; manufactured by Mitsui Toatsu Chemicals Inc.) was dissolved in a solvent N-methyl pyrrolidone to a resin proportion of 10–30% by weight to the solvent and then diluted with xylene to prepare a polyether sulfone type binder. With the binder was bound a polyacrylonitrile-origin carbon fiber with its surface treated by electrolytic oxidation (HTA-type; manufactured by Toho Rayon Co.). The resulting strand was cut off to a length of 6 mm to prepare a chopped carbon fiber. The carbon fiber, without heat treatment, was blended and kneaded with a polyether ether ketone resin (PEEK; manufactured by Mitsui Toatsu Chemicals Inc.) as the matrix resin so as to attain the carbon fiber content of 40% by weight.

Using the blend, tests were conducted in the same manner as described in Example 12. The results are summarized in Table 8.

Comparative Example 22

A chopped carbon fiber bound with a polyamide binder (HTA-6CN; manufactured by Toho Rayon Co.) was blended with a polyether ether ketone resin (PEEK; manufactured by Mitsui Toatsu Chemicals Inc.) to the carbon fiber content of 40% by weight, thereby preparing a resin composition as pellets. Using the resin composition, tests were made in much the same manner as described in Comparative Example 21. The results are summarized in FIG. 10 and Table 8.

Comparative Example 23

Figure 10:
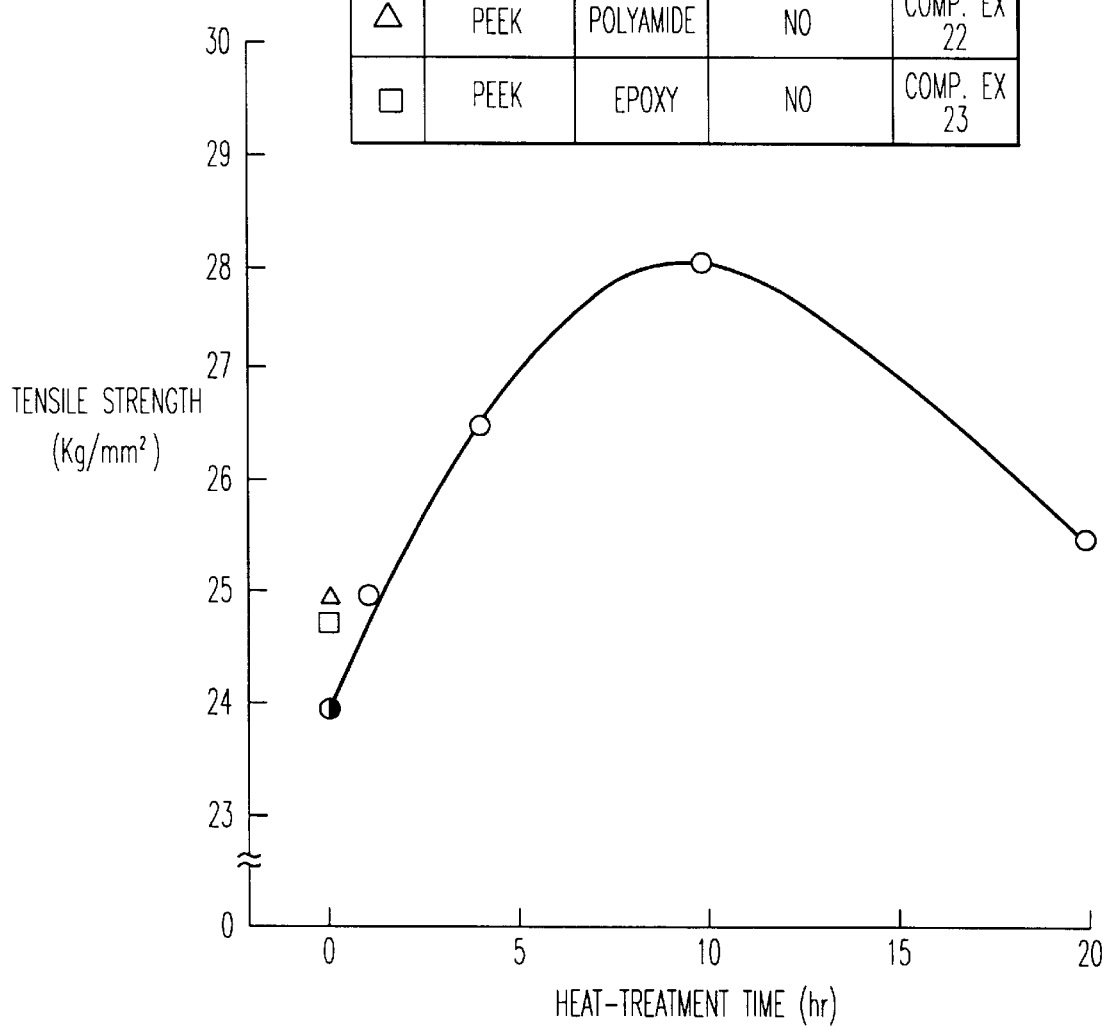

A chopped carbon fiber bound with an epoxy type binder (HTA-C6E; manufactured by Toho Rayon Co.) was blended with a polyether ether ketone resin (PEEK; manufactured by Mitsui Toatsu Chemicals Inc.) to the carbon fiber content of 40% by weight to prepare a resin composition as pellets. Using the resin composition, tests were conducted in much the same manner as in Comparative Example 12. The results are shown in FIG. 10 and Table 8.

Example 13

Figure 12:
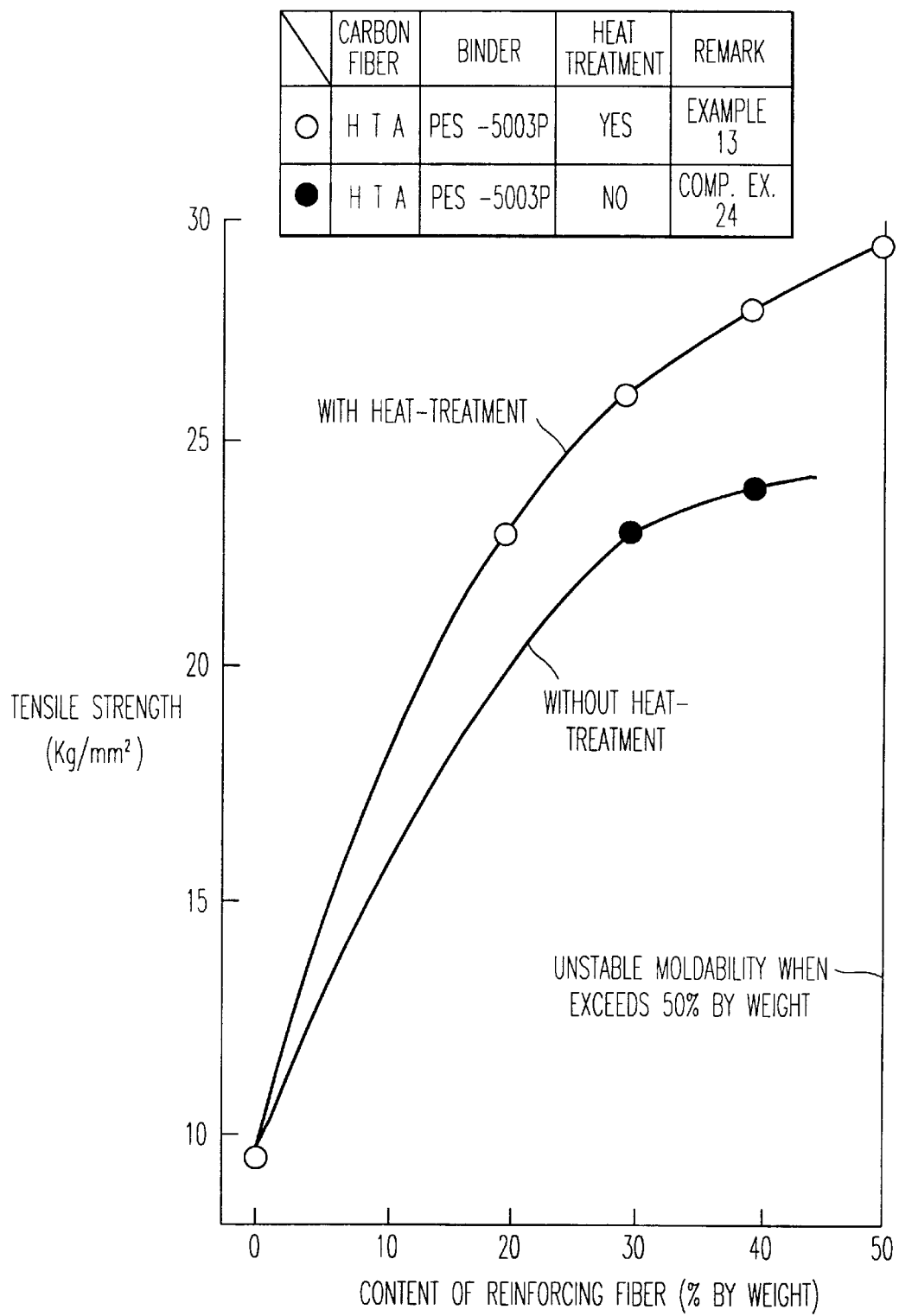

A low molecular polyether sulfone resin with hydroxyl groups at its (unit) terminals (5003P; manufactured by Mitsui Toatsu Chemicals Inc.) was dissolved in a solvent N-methyl pyrrolidone to a resin content of 10–30% by weight and then diluted with xylene to prepare a polyether sulfone type binder. With the binder was bound a polyacrylonitrile-origin carbon fiber with its surface treated by electrolytic oxidation (HTA-type; manufactured by Toho Rayon Co.). The resulting strand was cut off to a length of 6 mm to produce a chopped carbon fiber, which was treated at 370° C. for 10 hours in a heat treating furnace in an atmosphere of air. Then, a polyether ether ketone resin (PEEK; manufactured by Mitsui Toatsu Chemicals Inc.) as the matrix resin was blended with the carbon fiber treated as described above to the carbon fiber contents of 20, 30, 40 and 50% by weight to prepare resin compositions as pellets. Using the resin compositions, tests were made in the same manner as described in Comparative Example 21. The results are shown in FIG. 12. Then, among these resin compositions, only the composition containing 30% by weight of the carbon fiber was injected into a mold with the structure as illustrated in FIG. 3 under the molding conditions of a cylinder temperature of 390° C., a mold temperature of 200° C. and an injection pressure of 1,900 kg/cm², thereby obtaining impeller shaped products.

The products were subjected to machining operations and then to burst tests in the same manner as described in Example 12. The results are given in Table 8.

Comparative Example 24

A low molecular polyether sulfone resin with hydroxyl groups at its (unit) terminals (5003P; manufactured by Mitsui Toatsu Chemicals Inc.) was dissolved in a solvent N-methyl pyrrolidone to a mixing proportion of the resin to the solvent (a resin blending proportion) of 10–30% by weight and then diluted with xylene to prepare a polyether sulfone type binder. With this binder was bound a polyacrylonitrile-origin carbon fiber with its surface treated by electrolytic oxidation (HTA-type; manufactured by Toho Rayon Co.). The resulting strand was cut off to a length of 6 mm to form a chopped carbon fiber. The carbon fiber, without heat treatment, was mixed with a matrix resin (PEEK; manufactured by Mitsui Toatsu Chemicals Inc.) to the carbon fiber contents of 20, 30 and 40% by weight to prepare resin compositions as pellets. Using the resin compositions, tests were conducted in the same manner as described in Comparative Example 21. The results are given in FIG. 12.

Of these resin compositions, only the composition containing 30% by weight of the carbon fiber was molded under the same conditions as described in Example 13, and the resultant products were subjected to machining operations and then to burst tests. The results are given in Table 8.

TABLE 8

| | Burst Test Result | | |
|---|---|---|---|
| | Condtn. | | |
| | Burst test (13 × 10⁴ rpm) | | Burst test (20 × 10⁴ rpm) |
| | Temp. | | |
| | Room temp. | 100° C. | Room temp. |
| Example 12 | ◯ | ◯ | ◯ |
| Comp. Ex. 21 | ◯ | Δ | Δ |
| Comp. Ex. 22 | X | X | X |
| Comp. Ex. 23 | ◯ | X | X |
| Example 13 | ◯ | ◯ | ◯ |
| Comp. Ex. 24 | ◯ | X | X |

(Note)
Burst tests were conducted at 13 × 10⁴ rpm for 20 hours and at 30 × 10⁴ rpm for 5 seconds and the results were compared.
◯: Success: without burst (stable and not bursted)
Δ: Semi-success: some were successful but unstable
X: Fail: none was successful From the result given in Table 8, it can be seen that the impellers molded in the Examples are more excellent in thermal strength and anti-creep property than those of the Comparative Examples. In the case of using the commercially available carbon fibers described in Comparative Example 22 (polyamide type binder) and Comparative Example 23 (epoxy type binder), dissociation and gasification of the binders conceivably take place at the molding temperatures of 360–420° C. to evolve openings in the boundary between the matrix resin and the carbon fiber due to poor wetting. Thus, it is assumed that these impellers have reduced strengths as compared with the impeller of Example 12 (bound with a polyether sulfone type binder and treated with heat).

Example 14

Thirty percent by weight of the carbon fiber chopped strand covered with the aromatic polysulfone resin and heat-treated, which was obtained in Example 1, was dry-blended with 70% by weight of a polyether imide resin, ULTEM 1000 (trade name), manufactured by GE Company. While being molten and kneaded, the dry blend was extruded by an extruder with 40 mm diameter at a temperature of 380° C., thus obtaining uniformly blended pellets.

Then, the uniformly blended pellets were formed into a dumb-bell test specimen by means of a conventional injection molding machine under the conditions of a cylinder temperature of 380° C. and a mold temperature of 160° C. The tensile strength of the specimen was measured and found to be 2,360 kg/cm$^2$.

Comparative Example 25

An experiment was conducted in the same manner as in Example 14 except for the use of an acrylic-origin carbon fiber bound with an epoxy resin in place of the carbon fiber chopped strand covered with the aromatic polysulfone resin and heat-treated used in Example 14, so that a dumb-bell test specimen of a carbon fiber-blended polyether imide resin was prepared. Its tensile strength was measured and found to be 1,820 kg/cm$^2$.

Example 15

Thirty percent by weight of the carbon fiber chopped strand covered with the aromatic polysulfone resin and heat-treated, which was obtained in Example 1, was dry-blended with 70% by weight of a polyphenylene sulfide resin, Ryton P-4 (trade name) made by Phillips Petroleum Co. While being molten and kneaded, the dry blend was extruded at a temperature of 340° C. by an extruder with a diameter of 40 mm, thereby obtaining uniformly blended pellets.

Then, the uniformly blended pellets were formed into a dumb-bell test specimen by means of a conventional injection molding machine under the conditions of a cylinder temperature of 360° C. and a mold temperature of 120° C. The tensile strength of the specimen was measured and found to be 2,230 kg/cm$^2$.

Comparative Example 26

An experiment was carried out in the same manner as in Example 15 except for the use of an acrylic-origin carbon fiber bound with an epoxy resin in place of the carbon fiber chopped strand covered with the aromatic polysulfone resin and heat-treated used in Example 15, so that a dumb-bell test specimen of a carbon fiber-filled polyphenylene sulfide resin was prepared. Its tensile strength was measured and found to be 1,179 kg/cm$^2$.

Example 16

A polyether sulfone solution consisting of 10% by weight of "VICTREX Polyether Sulfone PES 5003P (trade name)" made by Imperial Chemical Industries Ltd., 45% by weight of dichloromethane and 45% by weight of 1,1,2-trichloroethane was prepared. A roving of an acrylic-origin carbon fiber with its surface oxidized was immersed continuously in the polyether sulfone solution at a rate of 80 m/hr. The resulting roving was dried to remove the solvents and was cut off to a length of 3 mm to prepare a chopped strand.

The amount of the aromatic polysulfone resin fixed was 1% based on the carbon fiber.

The carbon fiber chopped strand was put in a vat made of stainless steel, admitted in an electric furnace having been raised in temperature to 350° C., and treated with heat for 10 hours in an atmosphere of air.

A dumb-bell test specimen of a carbon fiber blended PEEK resin was prepared in the same manner as in Example 1 except for the use of the heat-treated carbon fiber chopped strand. Its tensile strength was measured and found to be 2,250 kg/cm$^2$.

Example 17

A roving of an acrylic-origin carbon fiber having its surface oxidized was immersed continuously in the polyether sulfone solution prepared in Example 1 at a rate of 60 m/hr. Then, it was dried and removed with the solvents. Thereafter, the roving was immersed again continuously in the polyether sulfone solution at a rate of 60 m/hr, followed by drying and removal of the solvents.

The amount of the aromatic polysulfone resin fixed was 9% based on the carbon fiber.

The resultant carbon fiber chopped strand was put in a vat made of stainless steel and introduced in an electric furnace having been raised in temperature to 350° C., where it was treated with heat for 10 hours in an atmosphere of air.

A dumb-bell test specimen of a carbon fiber-blended PEEK resin was prepared in the same manner as in Example 1 except for the use of the heat-treated carbon fiber chopped strand. Its tensile strength was measured and found to be 2,380 kg/cm$^2$.

The heat-resistant resin composition of the invention, formed by blending a carbon fiber covered with an aromatic polysulfone resin and heat-treated, and a heat-resistant resin has excellent mechanical strength.

Further, the internal combustion engine part of the invention has an improved wetting property between the carbon fiber and the matrix resin so that its boundary strength is significantly improved, resulting in the accomplishment of increased strength of the part.

Moreover, in the case of the impellers, for example, their light-weight permits the improvement of the follow-up characteristics to the variation of engine load. Further, the accuracy of product surface is improved significantly as compared with that of aluminum alloys, so that it becomes possible to minimize the breakaway phenomenon at the surface of the vane for intake air upon high speed revolution, and also to increase the suction-compression efficiency.

We claim:

1. A carbon fiber which has been surface-coated with an aromatic polysulfone resin and then heated at 300–400° C. for from 1 to 20 hours prior to any blending or mixing of said fiber with any other material.

2. A carbon fiber as claimed in claim 1 which has been heated at 300–400° C. for from 3 to 20 hours prior to any blending or mixing of said fiber with any other material.

3. A carbon fiber according to claim 1 which has been heated at 300–400° C. for from 5 to 15 hours prior to any blending or mixing of said fiber with any other material.

4. A carbon fiber according to claim 1 which has been heated at 340–380° C. for from 1 to 20 hours prior to any blending or mixing of said fiber with any other material.

5. A carbon fiber according to claim 1 wherein said aromatic polysulfone resin comprises structural units selected from the group consisting of

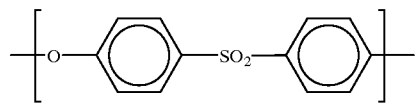

(1)

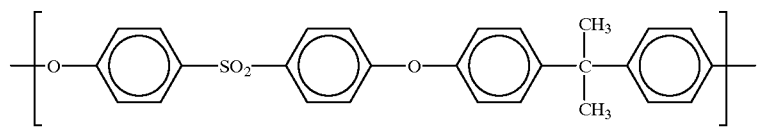

(2)

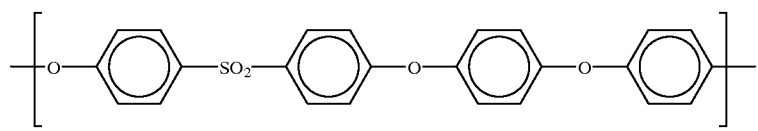

(3)

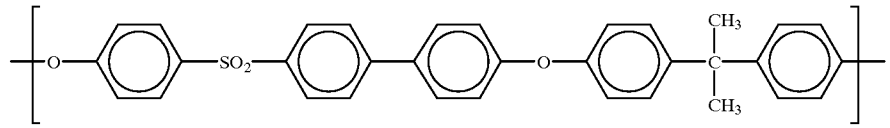

(4)

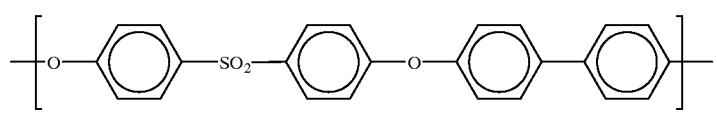

(5)

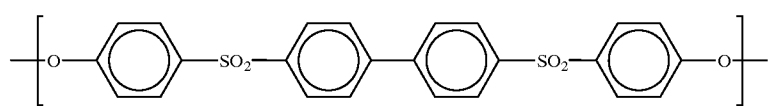

(6)

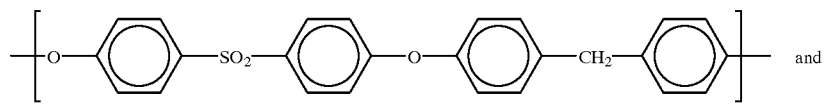

(7) and

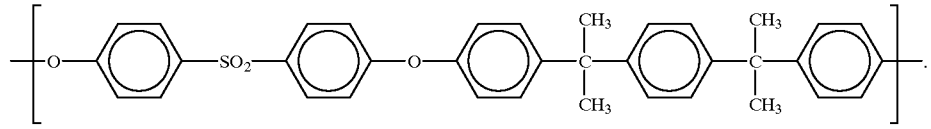

(8)

6. A carbon fiber according to claim 5, wherein said aromatic polysulfone resin comprises the following structural unit:

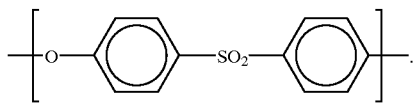

* * * * *